US011923968B2

(12) United States Patent
Tochio

(10) Patent No.: US 11,923,968 B2
(45) Date of Patent: Mar. 5, 2024

(54) OPTICAL TRANSMISSION DEVICE, OPTICAL TRANSMISSION SYSTEM AND METHOD OF UPDATING THE OPTICAL TRANSMISSION DEVICE

(71) Applicant: FUJITSU LIMITED, Kawasaki (JP)

(72) Inventor: Yuji Tochio, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 58 days.

(21) Appl. No.: 17/565,112

(22) Filed: Dec. 29, 2021

(65) Prior Publication Data

US 2022/0278767 A1 Sep. 1, 2022

(30) Foreign Application Priority Data

Mar. 1, 2021 (JP) .................................. 2021-31558
Oct. 13, 2021 (JP) ................................ 2021-168215

(51) Int. Cl.
*H04J 14/08* (2006.01)
*H04B 10/27* (2013.01)
*H04B 10/50* (2013.01)

(52) U.S. Cl.
CPC .............. *H04J 14/08* (2013.01); *H04B 10/27* (2013.01); *H04B 10/50* (2013.01)

(58) Field of Classification Search
None
See application file for complete search history.

(56) References Cited

U.S. PATENT DOCUMENTS 6,438,131 B1 * 8/2002 Gerber ................... H04L 65/80
370/469
2017/0324472 A1 * 11/2017 Kitamura ............ H04L 27/2601
2017/0324496 A1 * 11/2017 Yamada ................... H04J 14/02
2017/0366288 A1 * 12/2017 Yokota ..................... H04J 14/00
2019/0098381 A1 * 3/2019 Su ......................... H04L 12/413
2019/0305854 A1 * 10/2019 Campos ............. H04B 10/6164
2020/0266926 A1 * 8/2020 Su ........................... H04B 10/69
2020/0396050 A1 * 12/2020 Perras ..................... H04J 3/0638
2021/0075504 A1 * 3/2021 Ibach ..................... H04J 3/1652
2021/0289273 A1 * 9/2021 Xiang ................ H04Q 11/0062
2021/0321178 A1   10/2021 Araya et al.

FOREIGN PATENT DOCUMENTS

JP       2015-188126      10/2015
JP       2019-520744       7/2019
JP       2020-43388        3/2020

* cited by examiner

Primary Examiner — Li Liu
(74) Attorney, Agent, or Firm — STAAS & HALSEY LLP

(57) ABSTRACT

An optical transmission device includes: a signal processor, a first frame generator circuit and a second frame generator circuit. The signal processor accommodates a client signal into one or a plurality of time slot sequences among n time slot sequences. The first frame generator circuit generates a frame including the client signal accommodated into a part of time slot sequences among the n time slot sequences. The second frame generator circuit generates a frame including the client signal accommodated into other time slot sequences among the n time slot sequences. The signal processor accommodates the client signal into the n time slot sequences when the first frame generator circuit and the second frame generator circuit are implemented, and accommodates the client signal into the other time slot sequences when the first frame generator circuit is not implemented and the second frame generator circuit is implemented.

5 Claims, 32 Drawing Sheets

| CLIENT | NORMAL TIME | UPDATE TIME |
|---|---|---|
| ODU#1 (20G) | TS {1} {2, 4, 5, 10} | TS {1} {2, 4, 5, 10} |
| ODU#2 (20G) | TS {2} {2, 4, 5, 10} | TS {1} {3, 7, 8, 20} |
| ODU#3 (20G) | TS {3} {2, 4, 5, 10} | TS {2} {2, 4, 5, 10} |
| ODU#4 (20G) | TS {4} {2, 4, 5, 10} | TS {2} {3, 7, 8, 20} |
| TOTAL : 80G | n = 4 | h = 2 |

FIG. 10

| CLIENT | PRIORITY | NORMAL TIME | UPDATE TIME |
|---|---|---|---|
| ODU#1 (50G) | HIGH | TS {1} {1 ⋯ 10} | TS {1} {1 ⋯ 10} |
| ODU#2 (100G) | HIGH | TS {3} {1 ⋯ 10}<br>TS {4} {11 ⋯ 20} | TS {2} {1 ⋯ 10}<br>TS {1} {11 ⋯ 20} |
| ODU#3 (100G) | LOW | TS {2} {1 ⋯ 20} | |
| ODU#4 (100G) | LOW | TS {1} {11 ⋯ 20}<br>TS {3} {11 ⋯ 20} | |
| ODU#5 (50G) | HIGH | TS {4} {1 ⋯ 10} | TS {2} {11 ⋯ 20} |
| TOTAL : 400G | | n = 4 | h = 2 |

CLIENT INFORMATION: CLIENT, PRIORITY
MAPPING TABLE: NORMAL TIME, UPDATE TIME

FIG. 12

CLIENT INFORMATION

| CLIENT | PRIORITY | TS CONFIGURATION (Z→B) | TS CONFIGURATION (B→A) |
|---|---|---|---|
| ODU#1 (50G) | HIGH | TS {1} {1 ⋯ 10} | TS {1} {1 ⋯ 10} |
| ODU#2 (100G) | HIGH | TS {3} {1 ⋯ 10}<br>TS {4} {11 ⋯ 20} | TS {2} {1 ⋯ 10}<br>TS {1} {11 ⋯ 20} |
| ODU#3 (100G) | LOW | NO TRANSMISSION | NO TRANSMISSION |
| ODU#4 (100G) | LOW | NO TRANSMISSION | NO TRANSMISSION |
| ODU#5 (50G) | HIGH | TS {4} {1 ⋯ 10} | TS {2} {11 ⋯ 20} |
| TOTAL : 400G | | n = 4 | h = 2 |

FIG. 30

OPTICAL TRANSMISSION DEVICE, OPTICAL TRANSMISSION SYSTEM AND METHOD OF UPDATING THE OPTICAL TRANSMISSION DEVICE

CROSS-REFERENCE TO RELATED APPLICATIONS

This application is based upon and claims the benefit of priority of the prior Japanese Patent Applications No. 2021-031558, filed on Mar. 1, 2021 and No. 2021-168215, filed on Oct. 13, 2021, the entire contents of which are incorporated herein by reference.

FIELD

The embodiments discussed herein are related to an optical transmission device, an optical transmission system and a method of updating the optical transmission device.

BACKGROUND

OTN (Optical Transport Network) has widely been put into practical use as one of techniques for actualizing high-capacity optical communication. The OTN is defined in ITU-T standard G.709. Further, FlexO (or, OTUCn) is proposed as one of techniques for transmitting traffic exceeding 100G in the OTN. The FlexO is defined in ITU-T standard G.709.1 and 709.3. In addition, in the FlexO, traffic exceeding 100G is transmitted using optical components to transmit 100G traffic. Further, proposed is FlexO for transmitting 200G/400G traffic.

On the other hand, in order to improve performance of the optical network, it is preferable to replace earlier communication systems with a new communication system. For example, an optical transmission device for transmitting 400G traffic is updated to a configuration provided with 2 sets of 200G FlexO components from a configuration provided with 4 sets of 100G FlexO components.

In addition, proposed as related techniques is a technique for mapping a plurality of client signals into FlexO frames to transmit (e.g., Japanese National Publication of International Patent Application No. 2019-520744). Further, a method is proposed to promptly recover line disconnection occurring in changing setting of communication standard (e.g., Japanese Laid-open Patent Publication No. 2015-188126).

In updating an optical transmission device, it is preferable to sufficiently suppress effects according to a halt of communication service. Therefore, in updating the optical transmission device, it is preferable to halt a part of a plurality of components implemented inside the optical transmission device, and use remaining components to continue communication. In addition, in this case, it is sometimes necessary to change a band of a frame (e.g., ODU frame) for storing client signals in the OTN.

However, in the case of transmitting traffic exceeding 100G in the OTN, existing techniques do not support a method of changing a band (or, changing mapping) of a frame. For example, the ODUflex Hitless adjustment defined in ITU-T standard G.7044 is limited to traffic of 100G or less. Further, the Link capacity adjustment scheme defined in ITU-T standard G.7042 supports only links of maximum 40G. Therefore, in a communication system for transmitting traffic exceeding 100G in the OTN, the effect according to a halt of communication service is significant in updating the optical transmission device.

SUMMARY

According to an aspect of the embodiments, an optical transmission device is used in a communication system that transmits a frame. The optical transmission device includes: a signal processor configured to accommodate a client signal into one or a plurality of time slot sequences among n time slot sequences; a first frame generator circuit configured to generate a frame including the client signal accommodated into a part of time slot sequences among the n time slot sequences; and a second frame generator circuit configured to generate a frame including the client signal accommodated into other time slot sequences among the n time slot sequences. The signal processor accommodates the client signal into the n time slot sequences when the first frame generator circuit and the second frame generator circuit are implemented. The signal processor accommodates the client signal into the other time slot sequences when the first frame generator circuit is not implemented and the second frame generator circuit is implemented.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 10 illustrates an example of client information and mapping table;
FIG. 12 illustrates another example of the client information and mapping table.

FIG. 30 illustrates an example of TS configuration information;

DESCRIPTION OF EMBODIMENTS

The OTN (Optical Transport Network) interface defined in ITU-T standard G.709 is applied to an optical transmission device for actualizing long-distance and/or high-capacity optical communication. The OTN accommodates an arbitrary client signal into a frame of a specified format. Further, the OTN provides a function (i.e., multi-accommodation function) of accommodating a plurality of frames into a higher frame.

Figure 1:
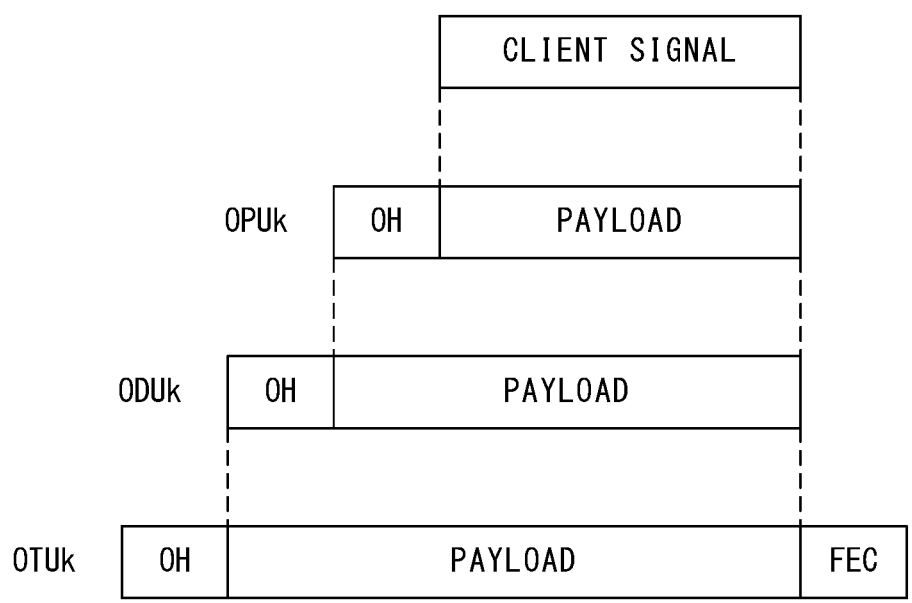
FIG. 1 illustrates a frame structure of OTN.

FIG. 1 illustrates a frame structure of the OTN. In the OTN, a client signal is accommodated into a payload of an OPUk (Optical Channel Payload Unit-k) frame. k identifies a transmission rate. The OPUk frame has OPU overhead. The OPUk frame is accommodated into a payload of an ODUk (Optical Channel Data Unit-k) frame. The ODUk frame has ODU overhead. The ODUk frame is accommodated into a payload of an OTUk (Optical Channel Transport Unit-k). The OTUk frame has OTU overhead. Further, the OTUk frame is provided with Forward Error Correction (FEC). In addition, the OTUk frame is a fixed-length frame.

In recent years, with increases in speed of the client signal, an OTN (B100G: Beyond 100G) exceeding 100 Gbps has been studied. In B100G, not only high-capacity transmission but also flexibility is considered. Therefore, an OTUCn frame is defined to multiplex n OTUC frames. Further, in ITU-T standard G.709.1 is defined FlexO (Flexible OTN) for multiplexing a plurality of physical interfaces. For example, a signal accommodated into the FlexO is the OTUCn.

Figure 2:
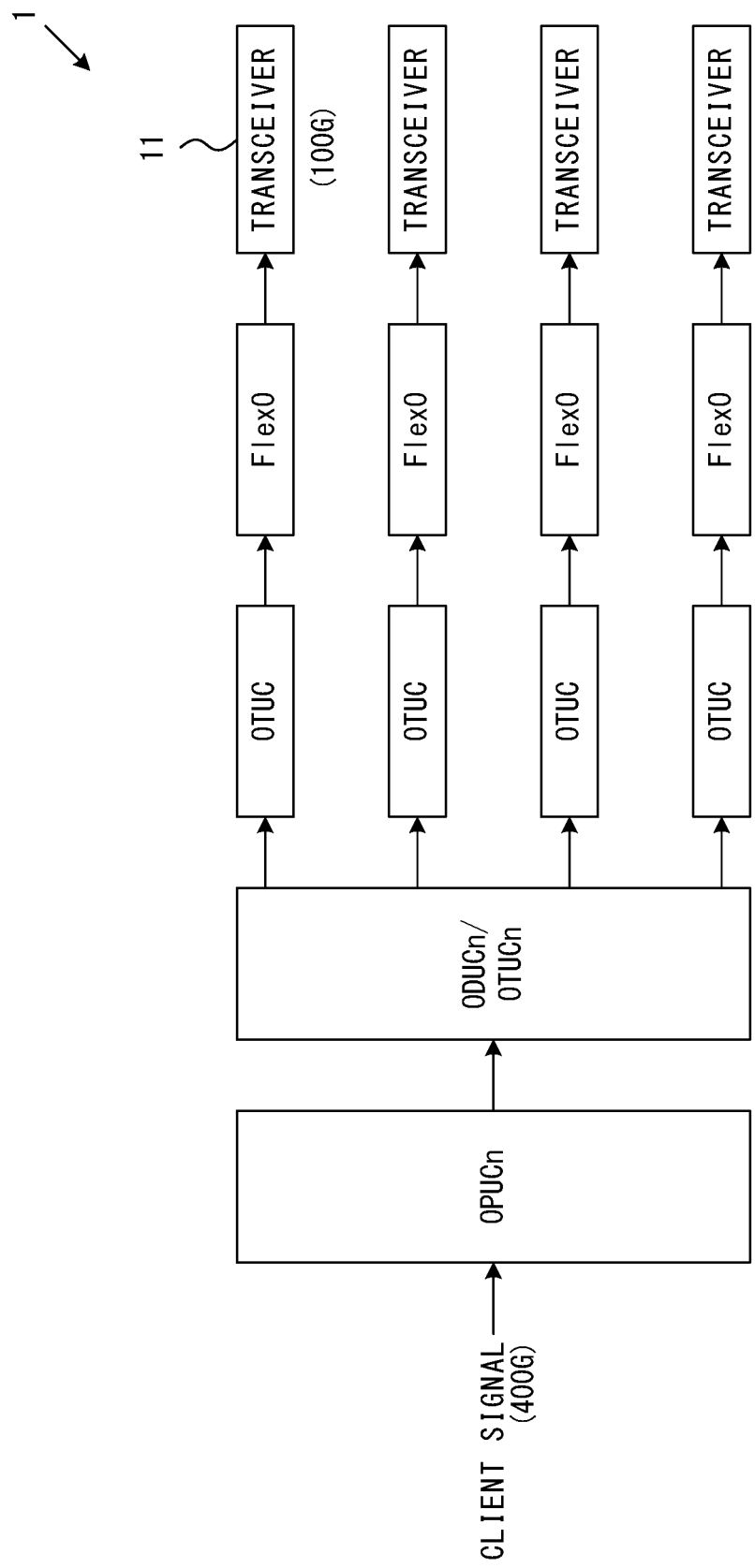
FIG. 2 illustrates an example of a flow of a signal inside an optical transmission device.

FIG. 2 is a diagram illustrating one example of a flow of a signal inside the optical transmission device. In addition, FIG. 2 illustrates the flow of the signal inside a transmission circuit for transmitting a frame that accommodates a client signal to a network. In other words, FIG. 2 omits a reception circuit for receiving a frame from the network.

A client signal is input to an optical transmission device 1. The client signal is accommodated into the OPUCn frame. The OPUCn frame is accommodated into the ODUCn frame, and further, the ODUCn frame is accommodated into the OTUCn frame. Subsequently, FlexO processing is performed. In other words, each of n OTUC frames constituting the OTUCn frame is accommodated into the FlexO frame. Then, a transceiver outputs an optical signal for transmitting the FlexO frame to a network.

In this example, it is assumed that a total bandwidth of the client signal is 400G. In this case, n=4 holds, and each of 4 OTUC frames is accommodated into the payload of the FlexO frame. In other words, 4 FlexO frames are generated.

Then, each transceiver 11 transmits the FlexO frame. In addition, each transceiver 11 is capable of transmitting a 100G optical signal.

In addition, performance is improved in components in the optical transmission device. For example, increases in speed have proceeded in optical components implemented in the transceiver. Therefore, it is possible to configure the optical transmission device with the lower number of components.

Figure 3:
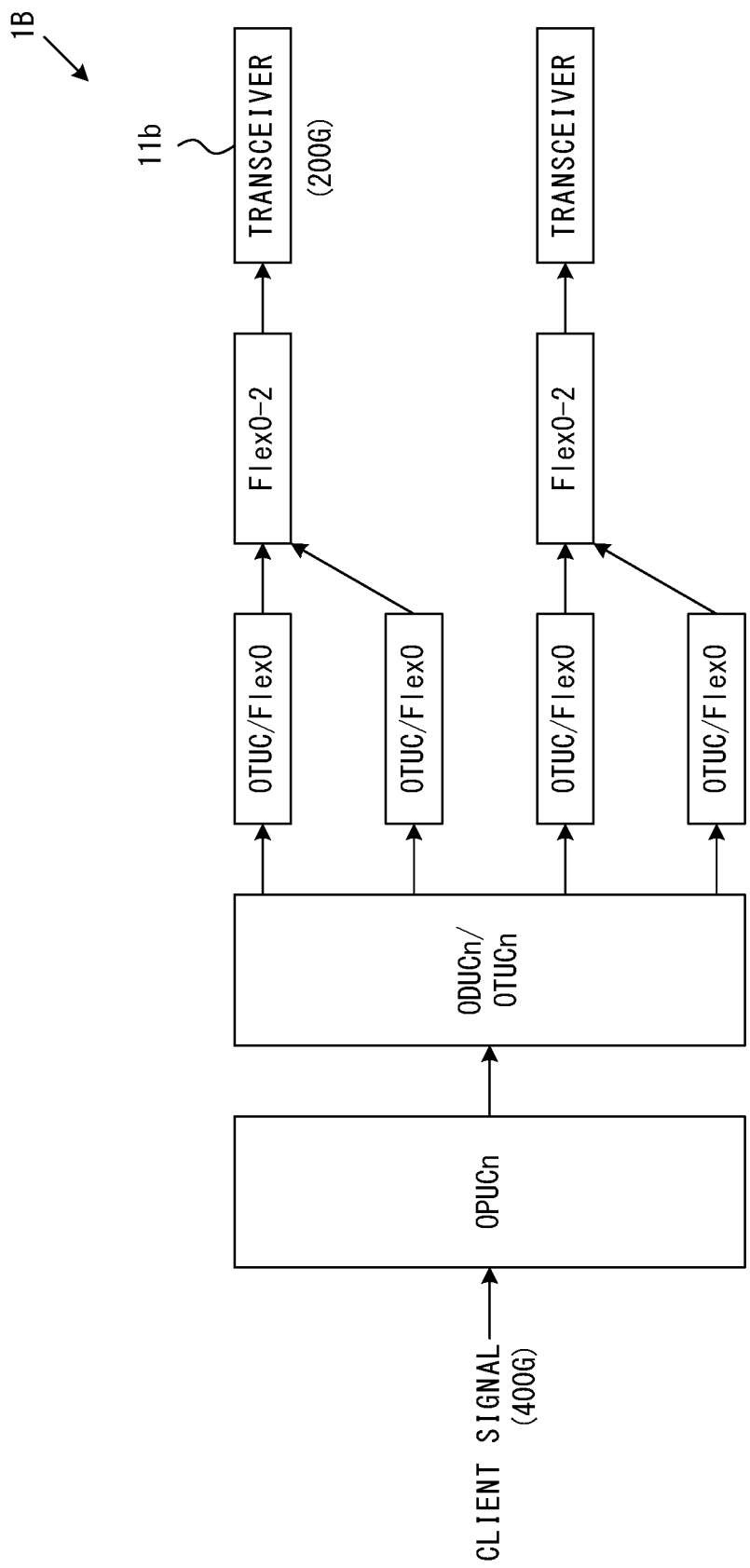
FIG. 3 illustrates another example of the flow of the signal inside the optical transmission device.

FIG. 3 illustrates another example of the flow of the signal inside the optical transmission device. A method of generating n FlexO frames for accommodating a client signal is substantially the same as in FIGS. 2 and 3.

In an optical transmission device 1B illustrated in FIG. 3, a plurality of FlexO frames are combined to generate a FlexO-x frame. In this embodiment, a FlexO-2 frame is generated by combining 2 FlexO frames. In other words, x=2 holds. At this point, as necessary, interleave is performed. Further, the FlexO-2 frame is provided with Forward Error Correction (FEC). Then, a transceiver 11b transmits the FlexO-2 frame to the network. In this example, each transceiver 11b is capable of transmitting a 200G optical signal.

Thus, in the configuration illustrated in FIG. 3, as compared with the configuration illustrated in FIG. 2, the number of ports provided in the optical transmission device is reduced. Further, in the case where the optical transmission devices 1, 1B are WDM transmission devices, and each transceiver is assigned a different wavelength, in the configuration illustrated in FIG. 3, as compared with the configuration illustrated in FIG. 2, usage efficiency is improved in wavelength resources.

However, in the existing communication system, in many cases, each node is equipped with the earlier optical transmission device (e.g., optical transmission device 1 illustrated in FIG. 2). Accordingly, in order to acquire the above-mentioned merit in the communication system where each node is equipped with the optical transmission device 1 illustrated in FIG. 2, it is preferable to update (i.e., upgrade) the optical transmission device 1 to the optical transmission device 1B illustrated in FIG. 3.

Figure 4:
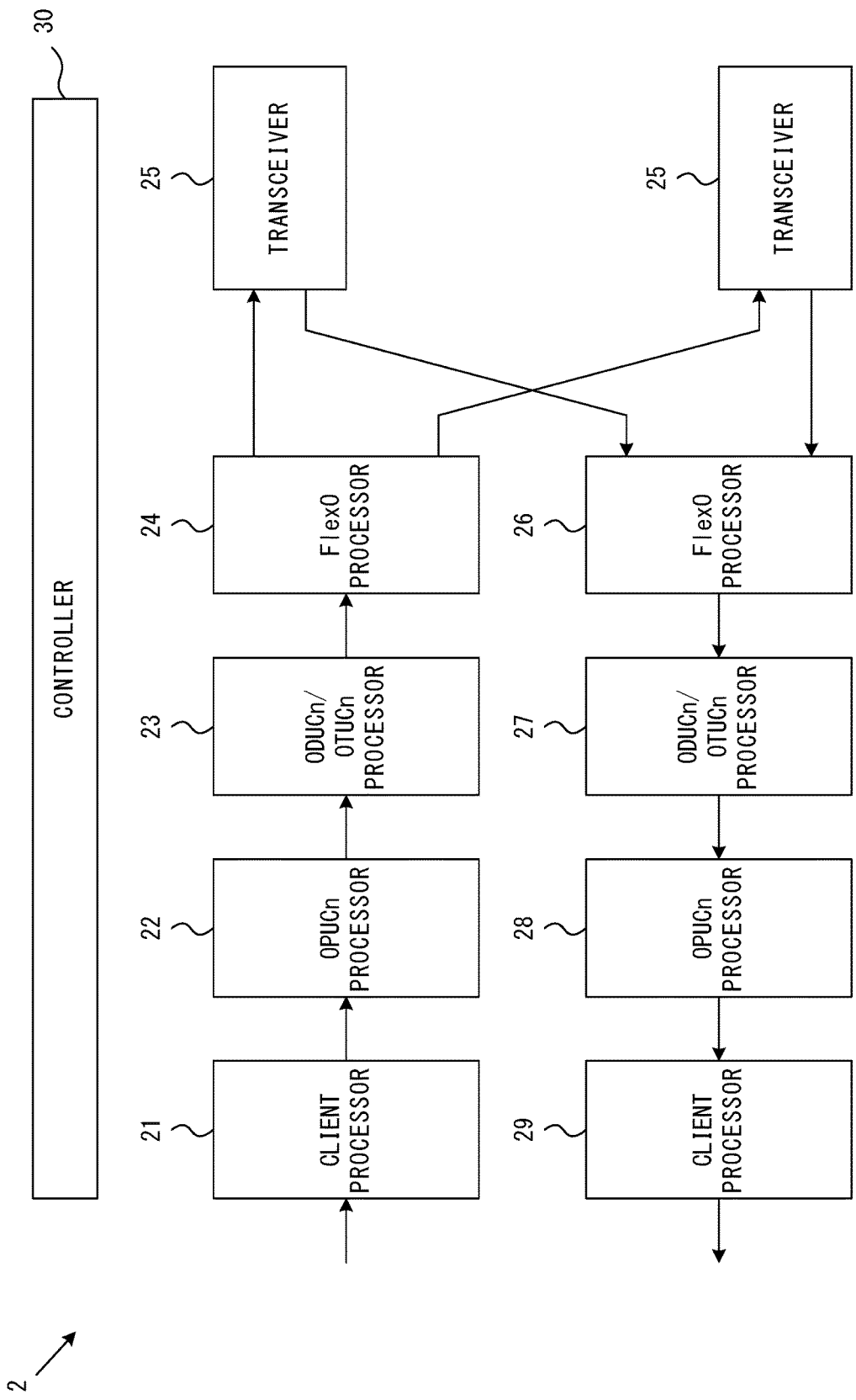
FIG. 4 illustrates an example of a configuration of the optical transmission device.

FIG. 4 illustrates an example of the configuration of the optical transmission device. An optical transmission device 2 is provided with a client processor 21, OPUCn processor 22, ODUCn/OTUCn processor 23, FlexO processor 24, transceivers 25, FlexO processor 26, ODUCn/OTUCn processor 27, OPUCn processor 28, client processor 29 and controller 30. In addition, the optical transmission device 2 may be provided with another circuit or function that is not illustrated in FIG. 4. Further, the optical transmission device 2 corresponds to the optical transmission device 1 illustrated in FIG. 2 or the optical transmission device 1B illustrated in FIG. 3.

The client processor 21 terminates a client signal generated by a client. In addition, the client processor 21 is provided with a plurality of input ports. Each input port is provided with a transceiver not illustrated in the figure. The OPUCn processor 22 accommodates the client signal into an OPUCn frame. The ODUCn/OTUCn processor 23 accommodates the OPUCn frame into an ODUCn frame, and further, accommodates the ODUCn frame into an OTUCn frame. Note that the OTUCn frame includes n OTUC frames.

The FlexO processor 24 accommodates each OTUC frame into an FlexO frame. In other words, n FlexO frames are generated. Further, as necessary, the FlexO processor 24 combines a plurality of FlexO frames to generate one or a plurality of FlexO-x frames.

Figure 5:
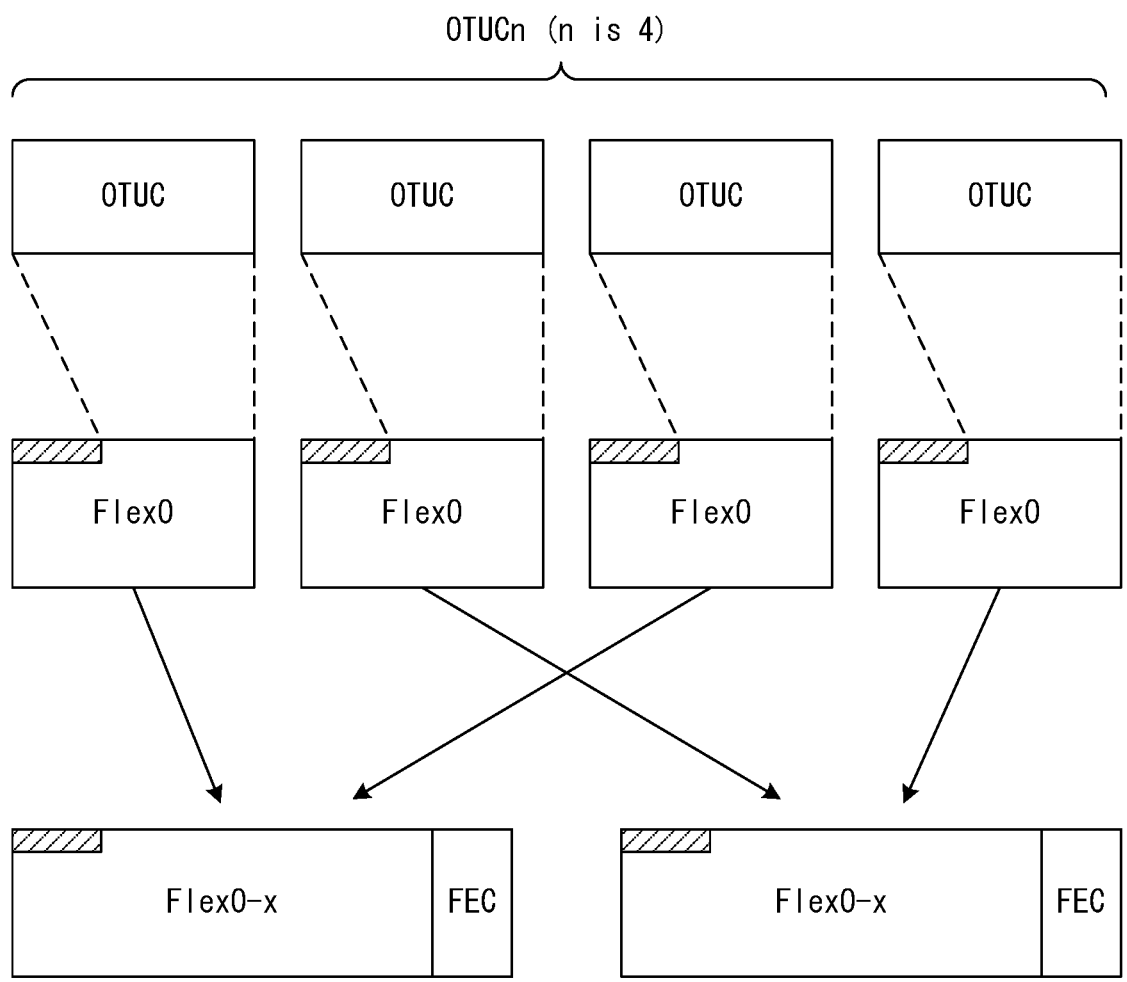
FIG. 5 illustrates an example of processing of a FlexO processor.

FIG. 5 illustrates an example of processing of the FlexO processor 24. In this example, 4 OTUC frames are generated by the ODUCn/OTUCn processor 23. Further, the optical transmission device 2 is provided with two transceivers 25. In this case, the OTUC frame is accommodated into a payload of the FlexO frame. As a result, 4 FlexO frames are obtained. Next, a FlexO-2 frame is generated by combining 2 FlexO frames. At this point, interleave may be performed. Further, Forward Error Correction (FEC) is added. Note that hatched areas represent control information including the overhead.

Descriptions will be returned to FIG. 4. The transceiver 25 transmits the FlexO frame or the FlexO-2 frame generated by the FlexO processor 24 to the network. Further, the transceiver 25 terminates an optical signal received via the network.

The FlexO processor 26 reproduces the FlexO frame from the received signal. Further, the FlexO processor 26 extracts the OTUC frame from the FlexO frame. The ODUCn/OTUCn processor 27 extracts the ODUCn frame from the OTUCn frame, and further, extracts the OPUCn frame from the ODUCn frame. The OPUCn processor 28 extracts the client signal from the OPUCn frame. The client processor 29 transmits the client signal to a corresponding client. Note that the client processor 29 is provided with a plurality of output ports. Each output port is provided with a transceiver not illustrated in the figure.

The controller 30 controls the client processor 21, OPUCn processor 22, ODUCn/OTUCn processor 23, FlexO processor 24, transceivers 25, FlexO processor 26, ODUCn/OTUCn processor 27, OPUCn processor 28 and client processor 29. A configuration and processing of the controller 30 will be described with reference to FIG. 6.

Figure 6:
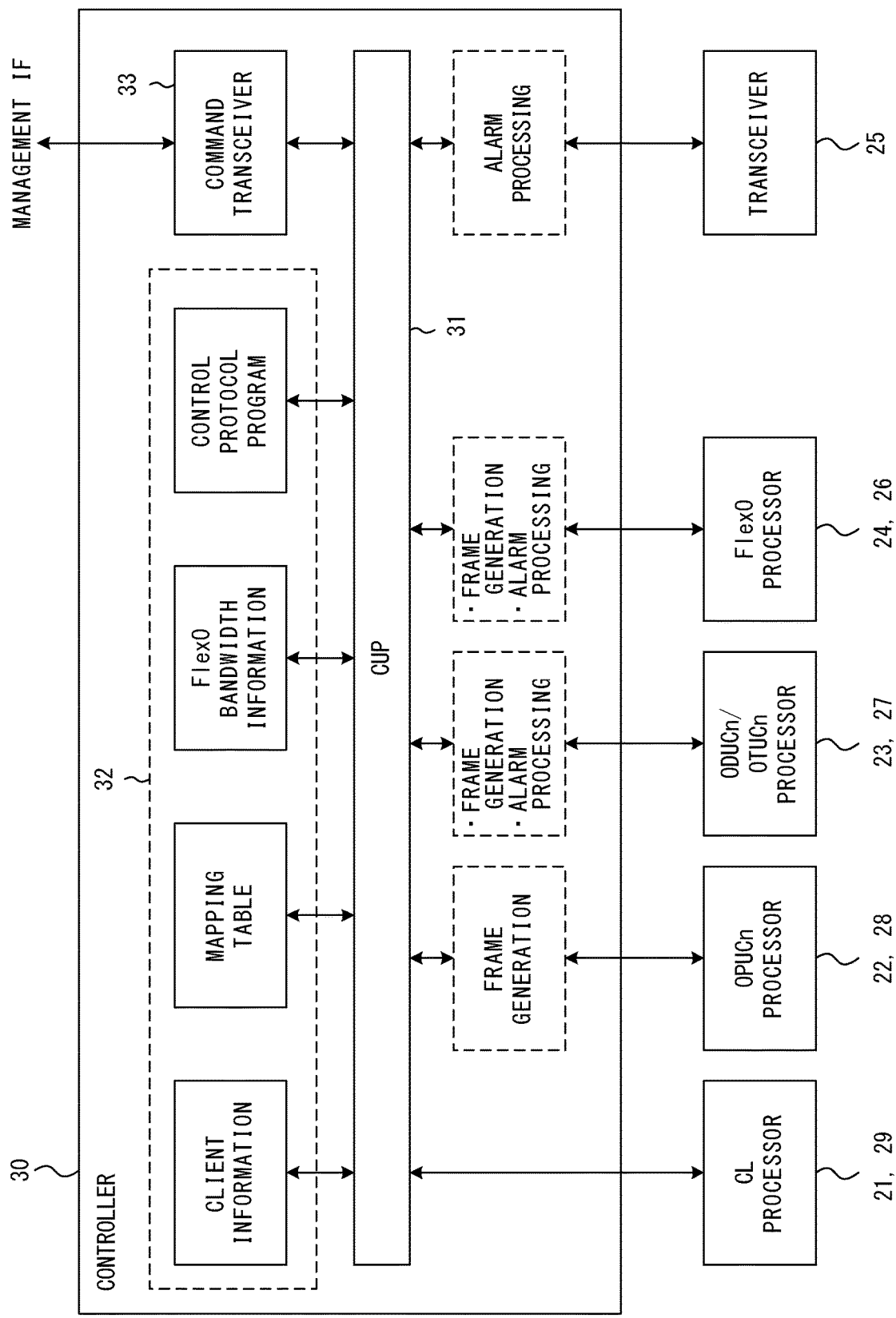
FIG. 6 illustrates an embodiment of a controller.

FIG. 6 illustrates an embodiment of the controller 30. The controller 30 is provided with a processor (CPU) 31, memory 32 and command transceiver 33. The controller 30 may be provided with a circuit or function that is not illustrated in FIG. 6.

The processor 31 executes a control protocol program stored in the memory 32, and thereby controls operation of the optical transmission device 2. A processing procedure by the control protocol program will be described later.

The memory 32 stores various types of control information. Client information includes information indicative of a bandwidth of each client signal, and information indicative of a priority of each client signal. A mapping table stores information to map each client signal into a tributary slot. The tributary slot is an example of time slots to accommodate the client signal. FlexO bandwidth information indicates a bandwidth of a FlexO-x frame. Further, although not illustrated in the figure, the memory 32 stores information to generate overhead and the like.

The command transceiver 33 receives a control command via a management interface. The control command is generated by a network administrator. Further, the control command includes a command for stopping or starting each component implemented in the optical transmission device 2. When the command transceiver 33 receives the control command, the processor 31 controls operation of the optical transmission device 2 according to the control command. Alarm processing will be described later.

In addition, for example, each of the OPUCn processor 22, ODUCn/OTUCn processor 23, FlexO processor 24, FlexO processor 26, ODUCn/OTUCn processor 27 and OPUCn processor 28 includes a write circuit for writing a signal into the memory and a read circuit for reading a signal from the memory. In this case, the write circuit may be a hardware circuit, and writes an input signal into an address corresponding to instructions provided from the controller 30. Further, the read circuit may be a hardware circuit, and reads a signal from an address corresponding to instructions provided from the controller 30. Note that a part of functions of the OPUCn processor 22, ODUCn/OTUCn processor 23, FlexO processor 24, FlexO processor 26, ODUCn/OTUCn processor 27 and OPUCn processor 28 may be implemented by software.

A procedure of updating the optical transmission device will be described next. The update of the optical transmission device includes procedures of replacing components implemented inside the optical transmission device. As one example, a 100G transceiver is replaced with a 200G transceiver. In addition, a transmission circuit for accommodating a client signal into a frame to transmit will be described below.

Figure 7:
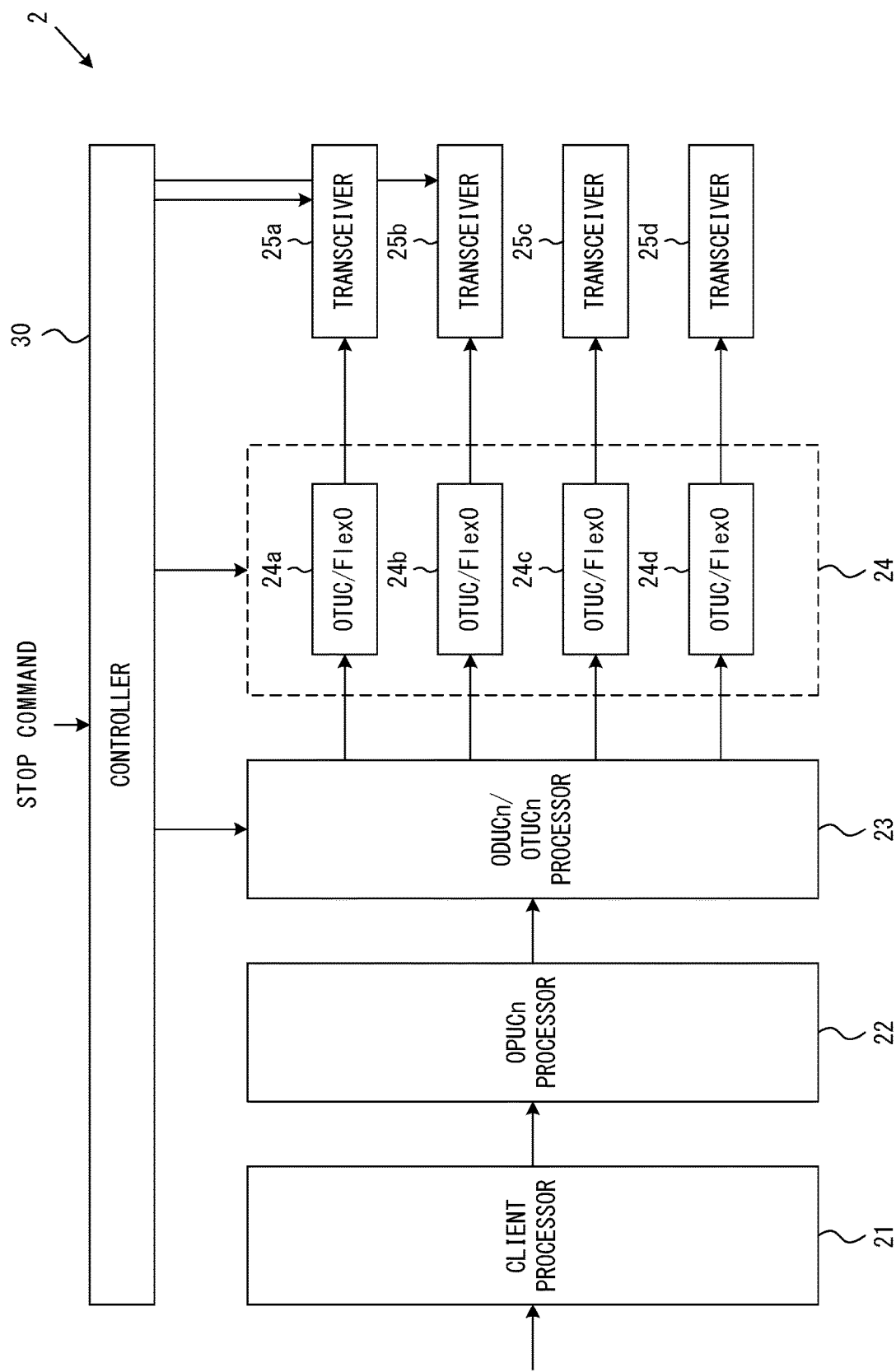
FIGS. 7 and 8 illustrate an example of a procedure of updating the optical transmission device.
Figure 8:
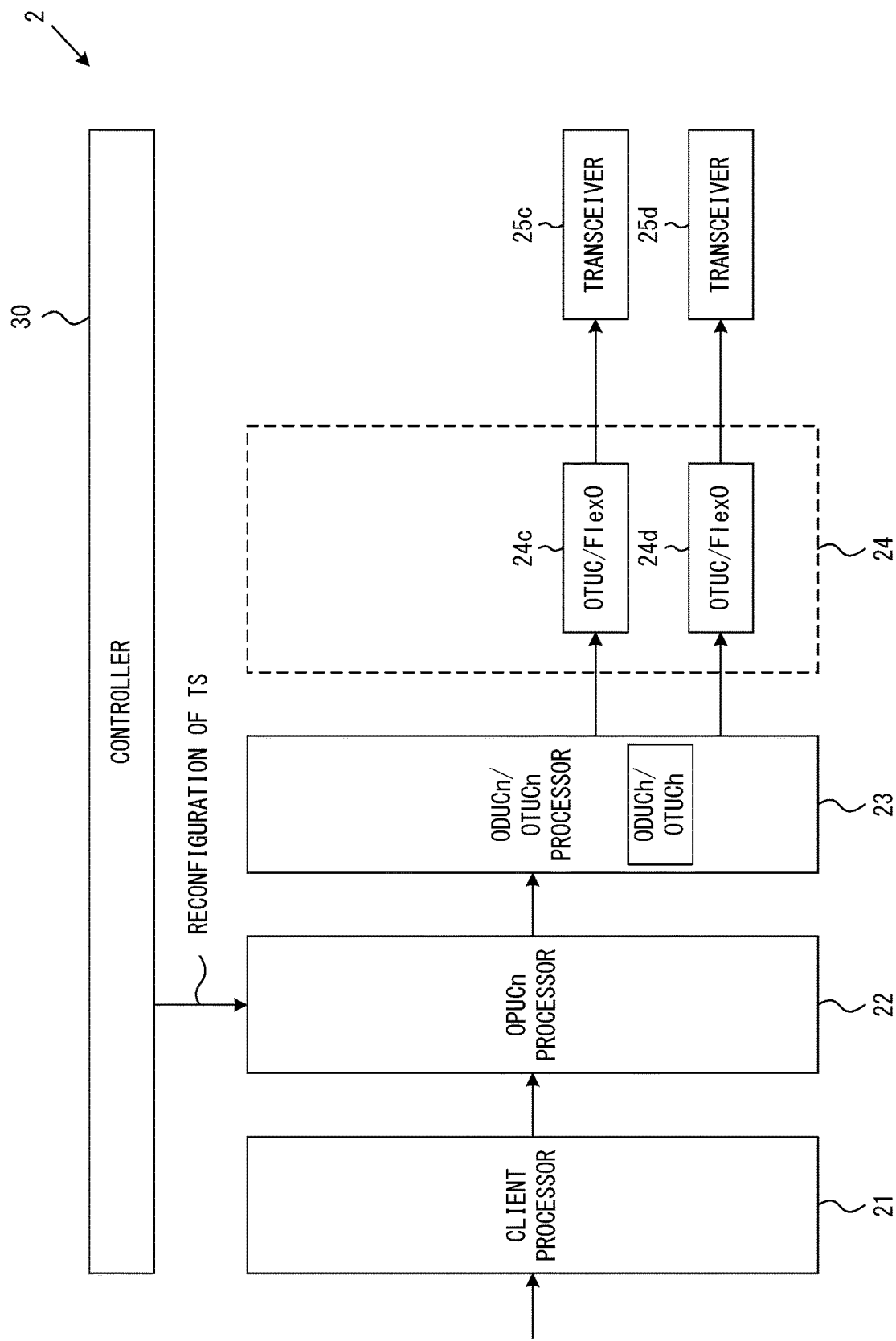

FIGS. 7 and 8 illustrate an example of the procedure of updating the optical transmission device. In this example, n=4 holds. In other words, the ODUCn/OTUCn processor 23 generates an OTUC4 frame. The OTUC4 frame includes 4 OTUC frames. Further, the FlexO processor 24 is provided with four FlexO processors 24a to 24d. Each of the FlexO processors 24a to 24d accommodates the OTUC frame into the FlexO frame. In other words, each of the FlexO processors 24a to 24d generates the FlexO frame in which the client signal is accommodated. Accordingly, the FlexO processors 24a to 24d are an example of frame generator circuits for generating a frame in which the client signal is accommodated.

Further, the optical transmission device is provided with four 100G transceivers 25a to 25d. The 100G transceivers 25a to 25d output optical signals for transmitting FlexO frames generated by the FlexO processors 24a to 24d to the network, respectively.

In the optical transmission device with the above-mentioned configuration, update is performed from the configuration illustrated in FIG. 2 to the configuration illustrated in FIG. 3. Herein, in order to continue communication service, first, a part of components is updated. In this example, the 100G transceivers 25a and 25b are replaced with one 200G transceiver. At this point, the 100G transceivers 25c and 25d continue to operate.

The controller 30 is given a stop command to stop the 100G transceivers 25a and 25b. The stop command is generated by a network administrator, for example. Then, corresponding to the stop command, the controller 30 stops the 100G transceivers 25a and 25b. At this point, the controller 30 may stop drive currents of laser light sources of the 100G transceivers 25a and 25b. Moreover, the controller 30 stops the FlexO processors 24a and 24b.

Further, the controller 30 controls signal processing of the ODUCn/OTUCn processor 23. Specifically, since the number of transceivers operating inside the optical transmission device is temporarily reduced from "4" to "2", a transmission rate of the ODUCn/OTUCn processor 23 is controlled to be a half. In other words, the controller 30 causes the ODUCn/OTUCn processor 23 to generate an OTUCh frame. Herein, h=n/2 holds. In other words, in the example illustrated in FIG. 7, the controller 30 causes the ODUCn/OTUCn processor 23 to generate an OTUC2 frame. The OTUC2 frame includes two OTUC frames. Note that control of the transmission rate of the ODUCn/OTUCn processor 23 is realized by reducing speed of a clock to a half.

By the above-mentioned procedure, a state illustrated in FIG. 8 is obtained. In other words, the ODUCn/OTUCn processor 23 is capable of generating the OTUC2 frame. Herein, h=2 holds. In other words, two OTUC frames are generated. Further, each of the FlexO processors 24c and 24d is capable of accommodating the OTUC frame into the FlexO frame. Then, each of the 100G transceivers 25c and 25d outputs an optical signal for transmitting the FlexO frame to the network.

Next, the controller 30 changes signal processing of the OPUCn processor 22. Herein, as defined in ITU-T standard G.709, the OPUCn processor 22 accommodates a client signal into a tributary slot, and thereby generates the OPUC frame. Then, by multiplexing n OPUC frames, an OPUCn frame is generated. Thus, the OPUCn processor 22 accommodates the client signal into the tributary slot. Accordingly, the OPUCn processor 22 is an example of a signal processor for accommodating the client signal into the tributary slot.

Figure 9A:
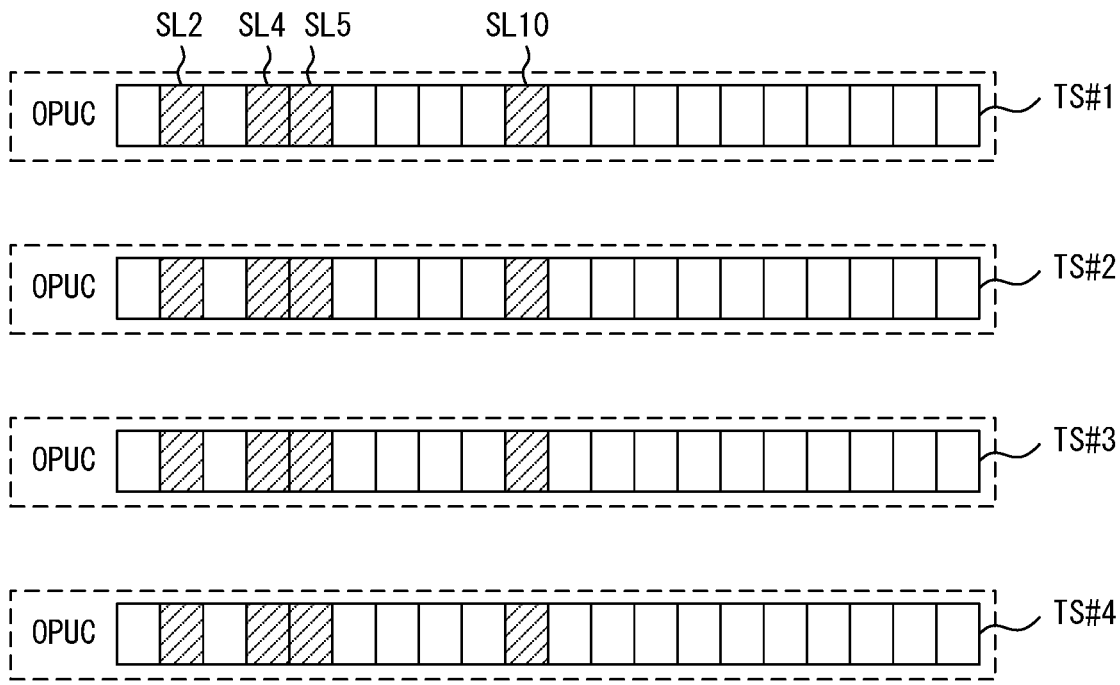
FIGS. 9A and 9B illustrates an example of mapping into tributary slots.
Figure 9B:
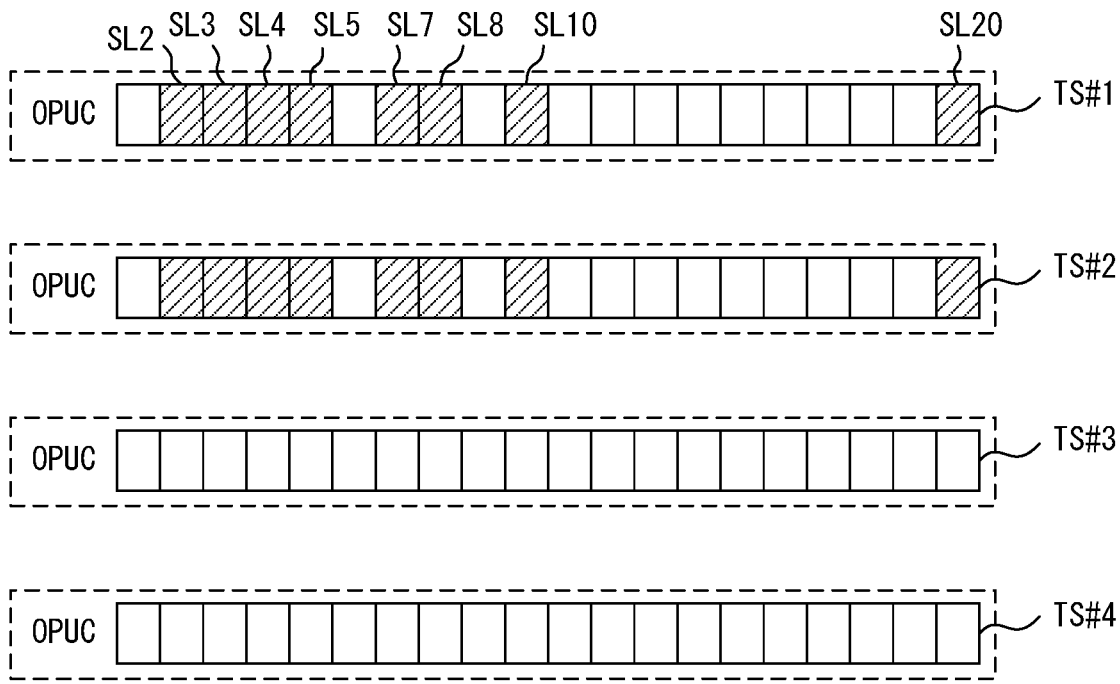

FIGS. 9A and 9B illustrate an example of mapping into tributary slots. A tributary slot TS includes 20 slots. Further, a transmission rate by one slot is assumed to be 5 Gbps. In this case, 100 Gbps is actualized by 20 slots. Further, in this embodiment, a total bandwidth of client signals is 400G. Accordingly, the OPUCn processor 22 is provided with four tributary slots TS #1 to TS #4. Note that the tributary slot TS is an example of time slot sequences for accommodating the client signal.

In the following description, the total bandwidth of client signals is 80 Gbps. Further, the client signals are evenly accommodated into the tributary slots TS #1 to TS #4. Furthermore, slot numbers for accommodating client signals are designated in advance. In this embodiment, as illustrated in FIG. 9A, client signals are accommodated into slots SL2, SL4, SL5 and SL10 of each of the tributary slots TS #1 to TS #4. As a result, four OPUC frames are generated. A transmission rate of the client signal transmitted by each OPUC frame is 20 Gbps. Then, an OPUCn (n=4) frame is generated by multiplexing four OPUC frames.

In updating the optical transmission device, as illustrated in FIG. 8, the ODUCn/OTUCn processor 23 generates an OTUCh (h=2) frame. The controller 30 gives instructions that the OPUCn processor 22 generates an OPUCh (h=2) frame. Then, according to the instructions from the controller 30, the OPUCn processor 22 generates the OPUCh (h=2) frame. In other words, the OPUCn processor 22 accommodates client signals into two tributary slots selected from among the tributary slots TS #1 to TS #4. In this embodiment, as illustrated in FIG. 9B, the controller 30 selects the tributary slots TS #1 and TS #2 from among the tributary slots TS #1 to TS #4. In other words, the client signals are evenly accommodated into the tributary slots TS #1 and TS #2. At this point, in each of the selected tributary slots, the client signals are accommodated into eight slots designated by each controller 30. In this embodiment, the client signals are accommodated into slots SL2 to SL5, SL7, SL8, SL10 and SL20. As a result, two OPUC frames are generated. A transmission rate of the client signal transmitted by each OPUC frame is 40 Gbps. Then, the OPUCh (h=2) frame is generated by multiplexing two OPUC frames.

Thus, before updating, client signals are accommodated into n tributary slots. At the time of update, the client signals are accommodated into h (h=n/2) tributary slots. Accordingly, at the time of update, since the OPUCh frame is generated and then the OTUCh frame is generated, h FlexO frames are generated. Accordingly, at the time of updating the optical transmission device, the client signals are transmitted by using h transceivers. In the example illustrated in FIGS. 7 and 8, the client signals are transmitted by using two transceivers 25c and 25d. By doing this, communication service is continued.

Note that operation at the time of update is equivalent to a transition from a state of mapping client signals (ODUk (k=0 to 4, 2e, flex)) into the ODTUCn to a state of mapping the client signals into the ODTUCh. In other words, the operation corresponds to a transition from a state of generating ODTUCn.ts to map into the OPUCn to a state of mapping into ODTUCh.ts.

For example, in the optical transmission device for preparing tributary slots TS{1, . . . , n}{1, . . . , 20}, mapping destinations of client signals at the time of update are limited to tributary slots TS{1, . . . , h}{1, . . . , 20}. Here, {1, . . . , n} represents n tributary slots, and {1, . . . , h} represents h tributary slots. Further, {1, . . . , 20} represents slot numbers capable of accommodating client signal. Then, clint signals accommodated into tributary slots TS{1, . . . , n}{i} will be accommodated into tributary slots TS{1, . . . , h}{j, k} at time of update. Note that one of "j" and "k" may be same as "i".

As one example, in the case illustrated in FIGS. 9A and 9B, the controller 30 designates "i=2, j=2, k=3". In this case, the client signal accommodated into the slot SL2 of the tributary slot TS #1 is accommodated into the slot SL2 of the tributary slot TS #1 at the time of update. Further, the client signal accommodated into the slot SL2 of the tributary slot TS #2 is accommodated into the slot SL3 of the tributary slot TS #1 at the time of update. Similarly, the client signal accommodated into the slot SL2 of the tributary slot TS #3 is accommodated into the slot SL2 of the tributary slot TS #2 at the time of update. Further, the client signal accommodated into the slot SL2 of the tributary slot TS #4 is accommodated into the slot SL3 of the tributary slot TS #2 at the time of update. As a result, the client signals accommodated into slots SL2 of four tributary slots are accommodated into slots SL2 and SL3 of two tributary slots.

Similarly, the controller 30 designates "i=4, j=4, k=7", "i=5, j=5, k=8" and "i=10, j=10, k=20". As a result, the client signals accommodated into four tributary slots #1 to #4 are accommodated into two tributary slots #1 and #2 at the time of update.

Note that the processing for mapping the client signal into the tributary slot TS is executed, by referring to the client information and mapping table. The client information and mapping table is beforehand generated, and is stored in the memory 32 illustrated in FIG. 6.

FIG. 10 illustrates an example of the client information and mapping table. In this example, the client information includes information indicative of a bandwidth of each client signal. Further, the mapping table includes information for designating a tributary slot TS to accommodate each client signal. In addition, the mapping table indicates the update illustrated in FIGS. 9A and 9B. In other words, by referring to the mapping table illustrated in FIG. 10, the OPUCn processor 22 actualizes the signal processing illustrated in FIGS. 7 to 9B.

In the above-mentioned embodiment, since the total bandwidth of the client signals is a bandwidth or less of the tributary slot TS or frame assigned to the client signals, also at the time of updating the optical transmission device, all of the client signals are accommodated into forwarding frames. In addition, depending on the total bandwidth of client signals, it is not possible to accommodate all of the client signals into forwarding frames at the time of update. Accordingly, the optical transmission device is provided with a function of selecting client signals to be transmitted according to priorities of clients.

Figure 11:
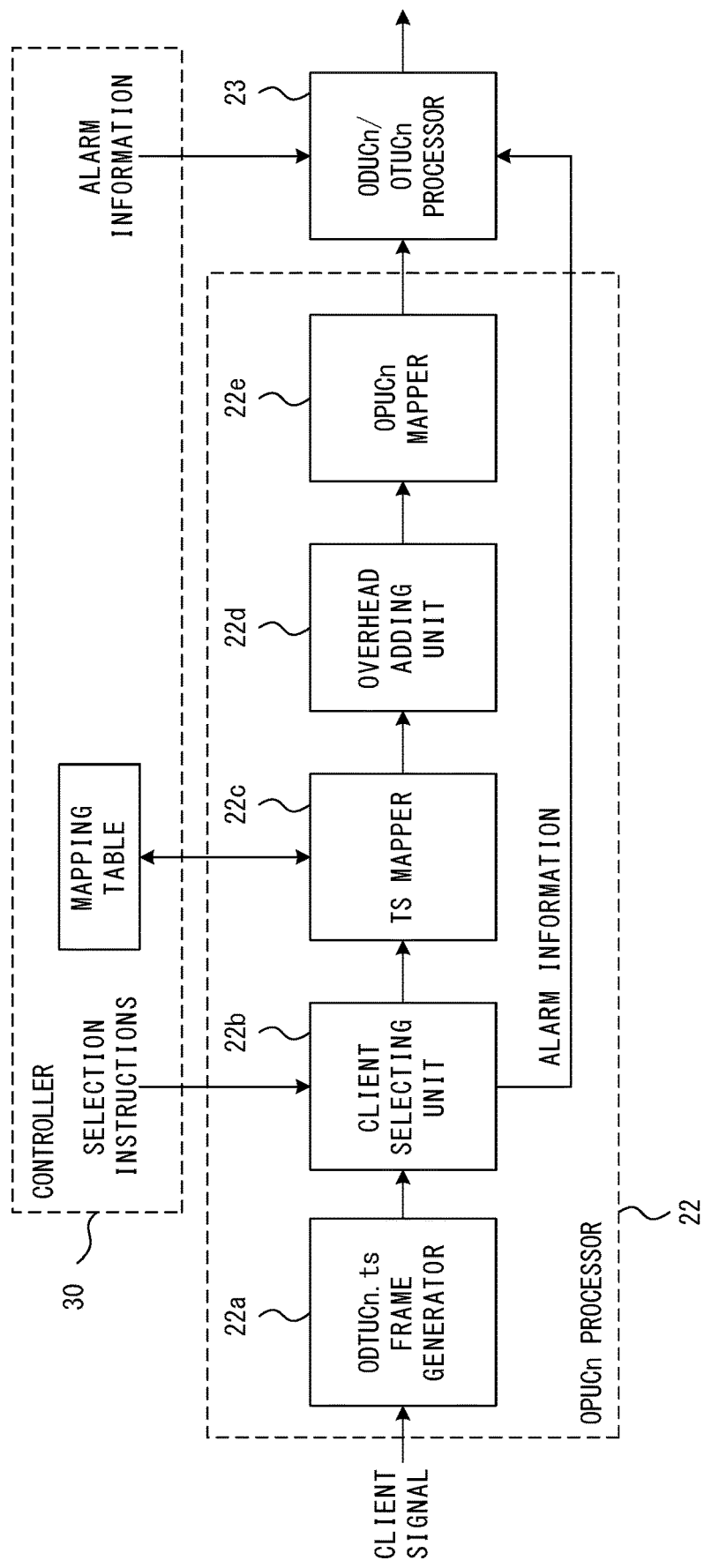
FIG. 11 illustrates an example of a function of selecting a client signal in updating the optical transmission device.

FIG. 11 illustrates an example of the function of selecting client signals at the time of updating the optical transmission device. The function of selecting client signals is mainly actualized by the controller 30 and OPUCn processor 22. The OPUCn processor 22 is provided with an ODTUCn.ts frame generator 22a, client selecting unit 22b, TS mapper 22c, overhead adding unit 22d, and OPUCn mapper 22e.

The ODTUCn.ts frame generator 22a accommodates a client signal into an ODTUCn.ts frame. According to selection instructions provided from the controller 30, the client selecting unit 22b selects one or a plurality of client signals. Specifically, the client selecting unit 22b selects the client signal designated by the controller 30 from among client signals input to the optical transmission device. At this point, the controller 30 selects one or a plurality of client signals based on the client information stored in the memory 32.

FIG. 12 illustrates another example of the client information and mapping table. In this embodiment, a maximum transmission rate of the optical transmission device is 400 Gbps, and a maximum transmission rate at the time of update is 200 Gbps. Further, client signals ODU #1 to ODU #5 are input to the optical transmission device. A total bandwidth of the client signals ODU #1 to ODU #5 is 400G.

The client information includes information indicative of a priority of each client signal. In this example, priorities of client signals ODU #1, ODU #2 and ODU #5 are high, and priorities of client signals ODU #3 and ODU #4 are low. In addition, for example, the priority of each client signal is beforehand determined by a contract and the like.

The mapping table is beforehand generated based on the priority of each client signal. The mapping information used in updating is generated so that the total bandwidth of client signals is the maximum transmission rate or less of the optical transmission device. At this point, the client signals are selected in ascending order of the priority. In the example illustrated in FIG. 12, the total bandwidth of the client signals ODU #1, ODU #2 and ODU #5 with high priorities is 200G. Accordingly, the tributary slot TS is assigned to the client signals ODU #1, ODU #2 and ODU #5, but the client signals ODU #3 and ODU #4 are not assigned the tributary slot TS. In this case, the controller 30 instructs the client selecting unit 22b to select the client signals ODU #1, ODU #2 and ODU #5. Then, the client selecting unit 22b selects the client signals ODU #1, ODU #2 and ODU #5 to output.

When the client selecting unit 22b does not select one or a plurality of client signals, the client selecting unit 22b unit may generate alarm information. In this case, the alarm information is to identify the client signal that is not selected. Then, the alarm information is fed to the ODUCn/OTUCn processor 23. Here, selection of client signals is substantially performed by the controller 30. Accordingly, the controller 30 may generate the alarm information. In this case, the controller 30 provides the ODUCn/OTUCn processor 23 with the alarm information.

Based on the mapping table, the TS mapper 22c accommodates the client signals selected by the client selecting unit 22b into tributary slots. Herein, it is assumed that the mapping table illustrated in FIG. 12 is prepared.

Figure 13A:
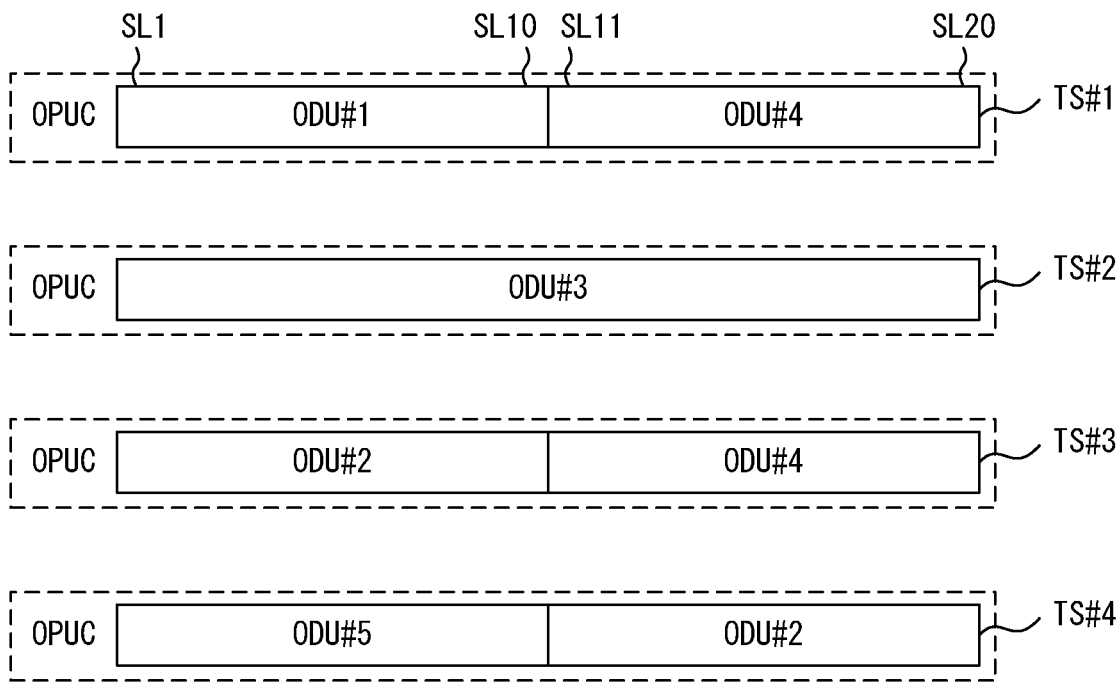
FIGS. 13A and 13B illustrate an example of mapping based on the mapping table illustrated in FIG. 12.
Figure 13B:
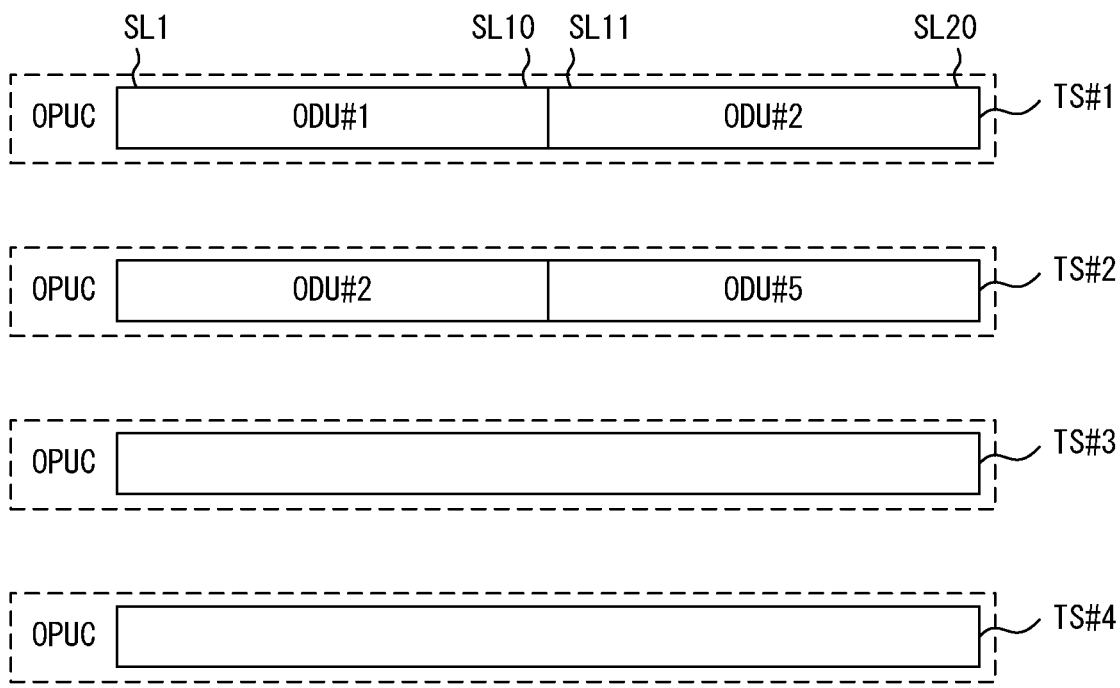

FIGS. 13A and 13B illustrate an example of mapping based on the mapping table illustrated in FIG. 12. Before updating the optical transmission device, as illustrated in FIG. 13A, the client signals ODU #1 to ODU #5 are accommodated into four tributary slots TS #1 to TS #4. At the time of updating the optical transmission device, as described above, the client signals ODU #1, ODU #2 and ODU #5 are selected. Thus, as illustrated in FIG. 13B, the selected client signals ODU #1, ODU #2 and ODU #5 are accommodated into two tributary slots #1 and #2. At this point, any client signals are not accommodated into tributary slots #3 and #4.

The overhead adding unit 22d adds overhead OH to an output signal of the TS mapper 22c. As a result, the ODTUCn.ts frame is reconfigured. In addition, for example, the controller 30 generates the overhead OH. Then, the OPUCn mapper 22e maps the ODTUCn.ts frame into the OPUCn frame.

The ODUCn/OTUCn processor 23 generates the OTUCn frame from the OPUCn frame generated by the OPUCn processor 22. In addition, as described above, the OTUCn frame is mapped into n FlexO frames. Further, when the above-mentioned alarm information is given, the ODUCn/OTUCn processor 23 forwards the alarm information to a destination node of the optical transmission device. In this case, for example, the alarm information may be inserted in overhead of the ODUCn frame or OTUCn frame. Further, the alarm information may be forwarded to a destination of the client signal that is not selected. The alarm information may be CSF (Client Signal Fail).

Figure 14:
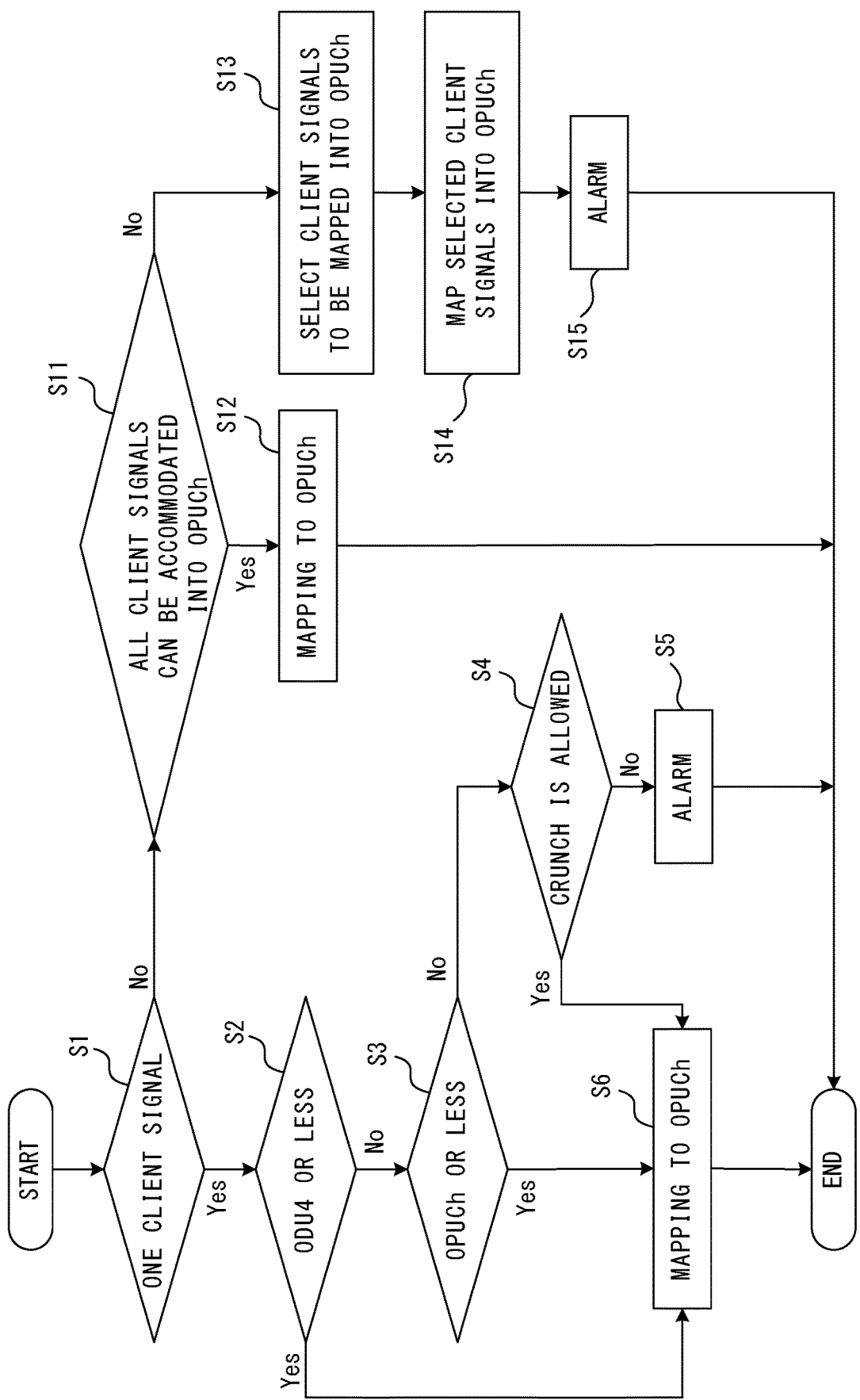
FIG. 14 is a flowchart illustrating an example of processing for accommodating the client signal in updating the optical transmission device.

FIG. 14 is a flowchart illustrating an example of processing for accommodating a client signal at the time of updating the optical transmission device. For example, when the controller 30 is provided with a stop command, the processing of the flowchart is executed. In addition, the client information is stored in the memory 32. The client information is assumed to include information indicative of a client under communication, information indicative of a type (transmission rate or bandwidth) of each client, and information indicative of a priority of each client signal.

In S1, the controller 30 detects the number of client signals under communication. Note that, by referring to the client information, the controller 30 is capable of detecting the number of clients under communication.

When the number of client signals is "1", in S2, the controller 30 determines whether or not the client signal is ODU4 or less. When the client signal exceeds the ODU4, in S3, the controller 30 determines whether or not a transmission rate of the client signal is OPUCh or less. Here, it is assumed that a value of h corresponds to a transmission rate while updating the optical transmission device, and is beforehand designated.

When the transmission rate of the client signal exceeds OPUCh, in S4, the controller 30 determines whether or not to be able to control a bandwidth of the client signal within the OPUCh or less by crunch processing. Herein, in the crunch processing, an idle signal is deleted.

When the client signal exceeds the ODU4, the transmission rate of the client signal exceeds the OPUCh and it is not possible to reduce the bandwidth of the client signal within the OPUCh or less by the crunch processing, in S5, the controller 30 generates alarm information. In this case, the alarm information indicates that some or all of the client signal is not accommodated into a transfer frame at the time of updating the optical transmission device.

On the other hand, when the client signal is the ODU4 or less, the bandwidth of the client signal is the OPUCh or less, or it is possible to reduce the bandwidth of the client signal within the OPUCh or less by the crunch processing, in S6, the controller 30 provides the OPUCn processor 22 with a mapping instruction to accommodate the client signal into the tributary slot TS. In addition, the mapping instruction is generated based on the mapping table.

When a plurality of client signals are input, in S11, the controller 30 determines whether or not it is possible to accommodate all of the client signals into an OPUCh frame. The bandwidth of each client signal is indicated by the client information. Further, the capacity of the OPUCh frame is determined corresponding to a value of h. Then, when it is possible to accommodate all of the client signals into the OPUCh frame, in S12, the controller 30 generates a mapping instruction to accommodate all of the client signals into the tributary slot TS.

When it is not possible to accommodate all of the client signals into the OPUCh frame, in S13, the controller 30 selects one or a plurality of client signals to be accommodated into the OPUCh, by referring to the client information. Specifically, the one or a plurality of client signals to be accommodated into the OPUCh frame is/are selected based on the priority of each client signal. At this point, a client signal with high priority is selected, so that the total bandwidth of the selected client signal is the capacity of the OPUCh frame or less.

In S14, the controller 30 provides the OPUCn processor 22 with a mapping instruction to accommodate the selected client signal into the tributary slot TS. The mapping instruction is generated based on the mapping table. In S15, the controller 30 generates alarm information including information for identifying a client signal that is not selected.

In addition, as described by referring to FIG. 11, the alarm information generated in S5 or S15 is transmitted to the destination node of the optical transmission device. In this case, for example, the alarm information may be inserted in overhead of the ODUCn frame or OTUCn frame. Further, the alarm information may be transmitted to the destination of the client signal that is not selected.

Herein, a procedure of a flowchart illustrated in FIG. 14 will be described with reference to the client information and mapping table illustrated in FIG. 12. In the example illustrated in FIG. 12, a plurality of client signals ODU #1 to ODU #5 are input to the optical transmission device. Accordingly, the processing of the controller 30 proceeds to S11. In S11, the capacity of the OPUCh frame is 200G, and the total bandwidth of the client signals ODU #1 to ODU #5 is 400G. In other words, it is not possible to accommodate all of the client signals into the OPUCh frame. Accordingly, the processing of the controller 30 proceeds to S13.

In S13, the total bandwidth of client signals (ODU #1, ODU #2, ODU #5) with high priorities is 200G. Further, the capacity of the OPUCh frame is 200G. Accordingly, the controller 30 determines that it is possible to accommodate these three client signals into the OPUCh frame. In addition, it is not possible to accommodate more client signals into the OPUCh frame. Accordingly, only the client signals ODU #1, ODU #2 and ODU #5 are selected.

In S14, the controller 30 generates mapping information. The mapping information is as illustrated in FIGS. 12 to 13B. Then, in S15, the controller 30 generates the alarm information including the information for identifying the client signals (ODU #3, ODU #4) that are not selected.

Figure 15:
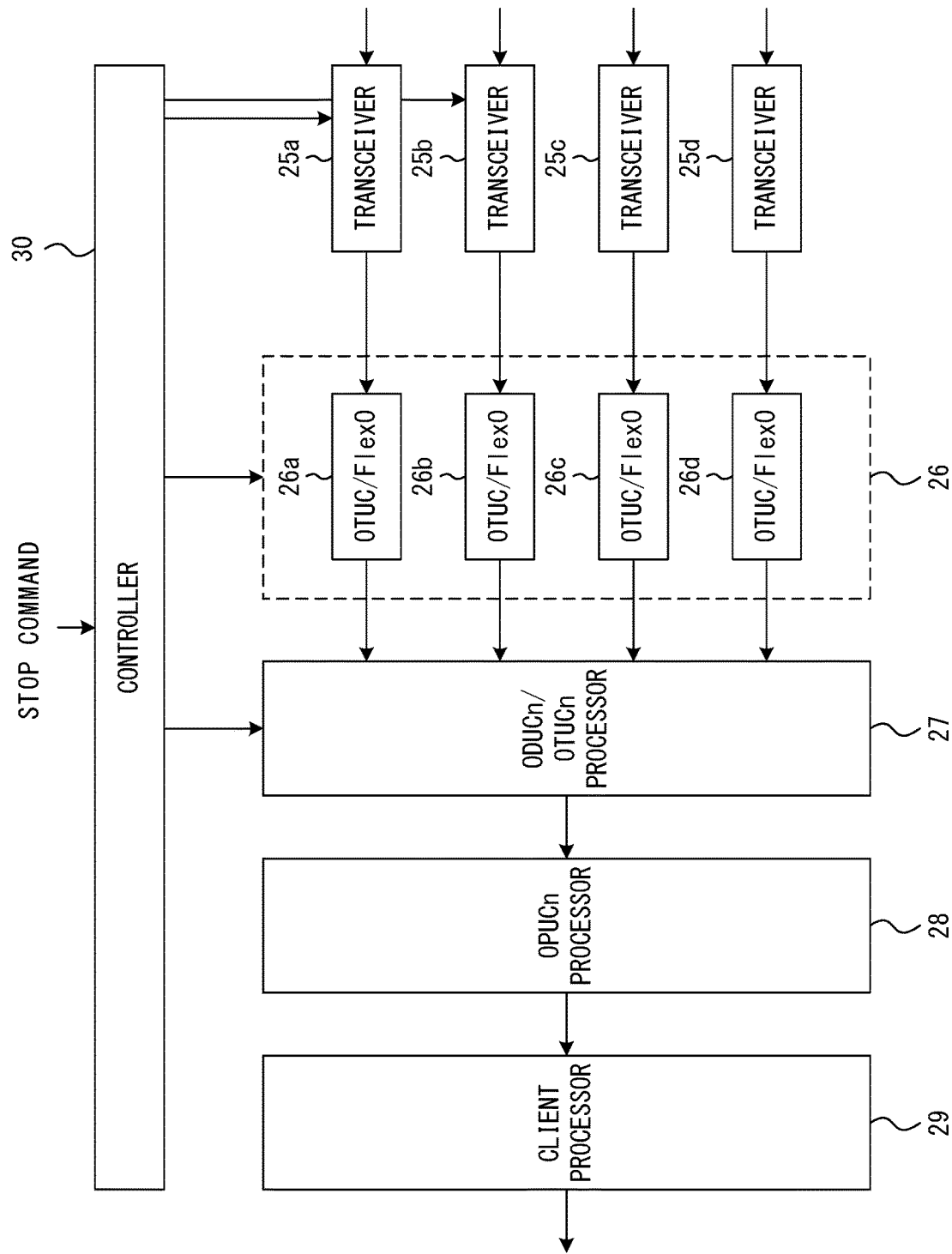
FIGS. 15 and 16 illustrate an example of a procedure of updating a reception circuit of the optical transmission device.
Figure 16:
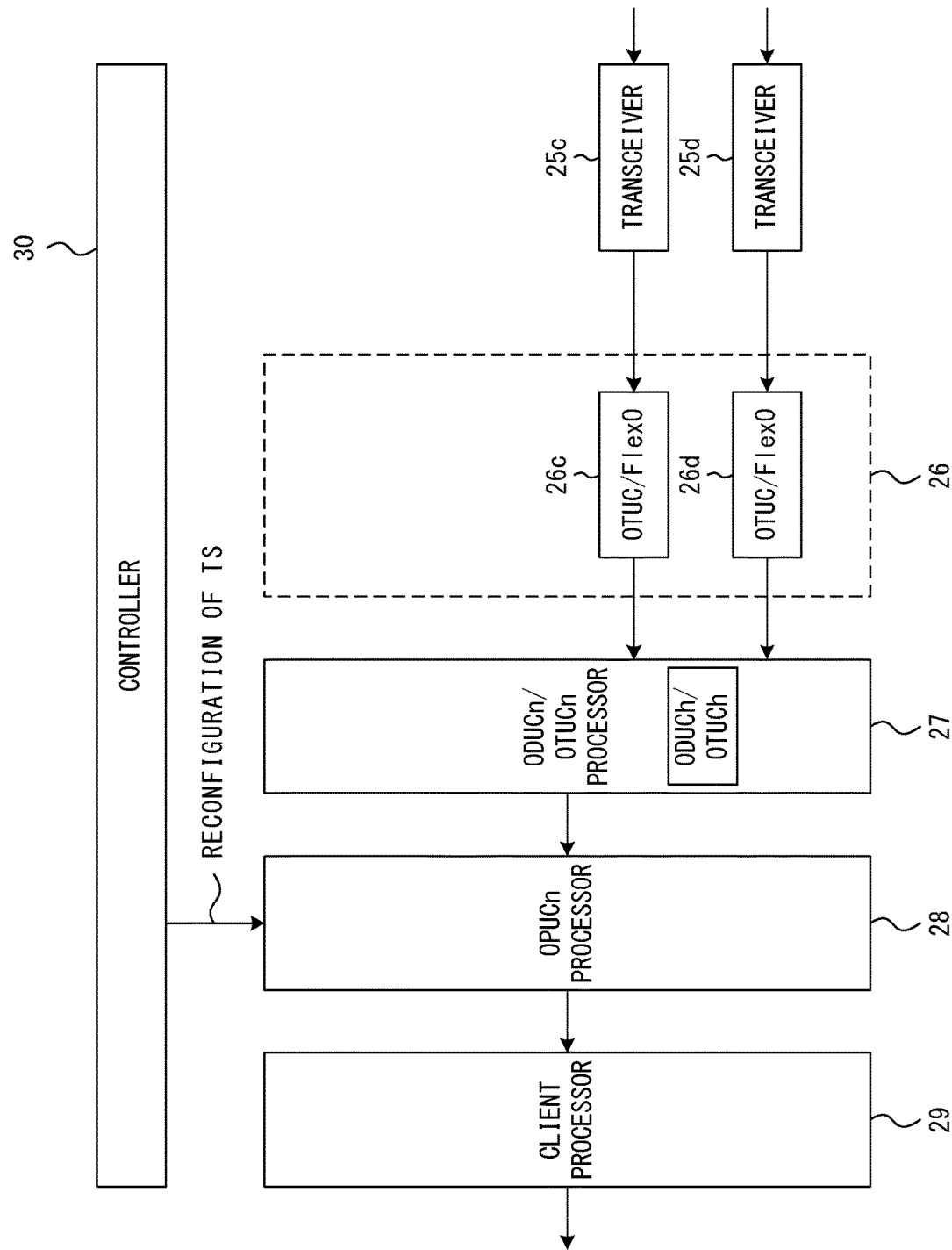

FIGS. 15 and 16 illustrate an example of a procedure of updating a reception circuit of the optical transmission device. The procedure of updating the reception circuit is substantially the same as the procedure of updating the transmission circuit.

In other words, when a stop command is given, the controller 30 stops the transceivers 25a and 25b. At this point, the transceivers 25c and 25d can receive optical signals. Then, FlexO processors 26c and 26d reproduce FlexO frames from the optical signals received by the transceivers 25c and 25d, and reproduce OTUCh frames from the FlexO frames, respectively. Accordingly, the FlexO processors 26c and 26d are an example of frame reproducing units for reproducing a frame from a received optical signal.

The ODUCn/OTUCn processor 27 extracts the ODUCh from the OTUCh frame, and extracts the OPUCh frame from the ODUCh frame. The OPUCn processor 28 extracts the client signal from the OPUCh frame. At this point, the OPUCn processor 28 refers to the client information and mapping table illustrated in FIG. 12. In addition, when alarm information is received from a transmission node, the controller 30 forwards the alarm information to a destination device that does not receive the client signal at the time of update.

Thus, at the time of updating the optical transmission device for generating an OPUCn/ODUCn/OTUCn frame, an OPUCh/ODUCh/OTUCh frame is generated. Herein, in the embodiment illustrated in FIGS. 7 to 16, h=n/2 holds. However, the present invention is not limited to h=n/2.

Figure 17:
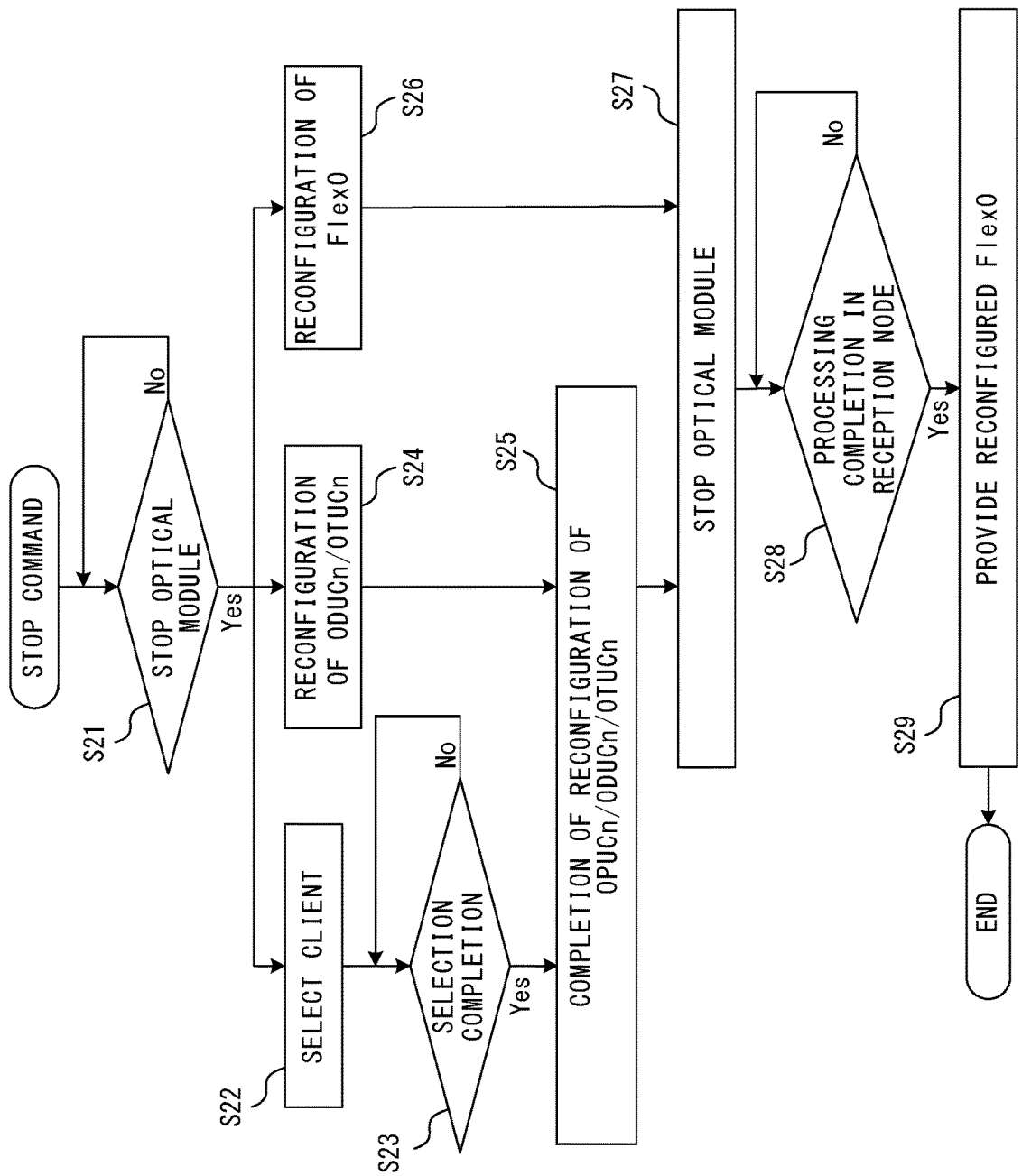
FIGS. 17 and 18 are flowcharts illustrating an example of a procedure of updating a set of optical transmission devices.
Figure 18:
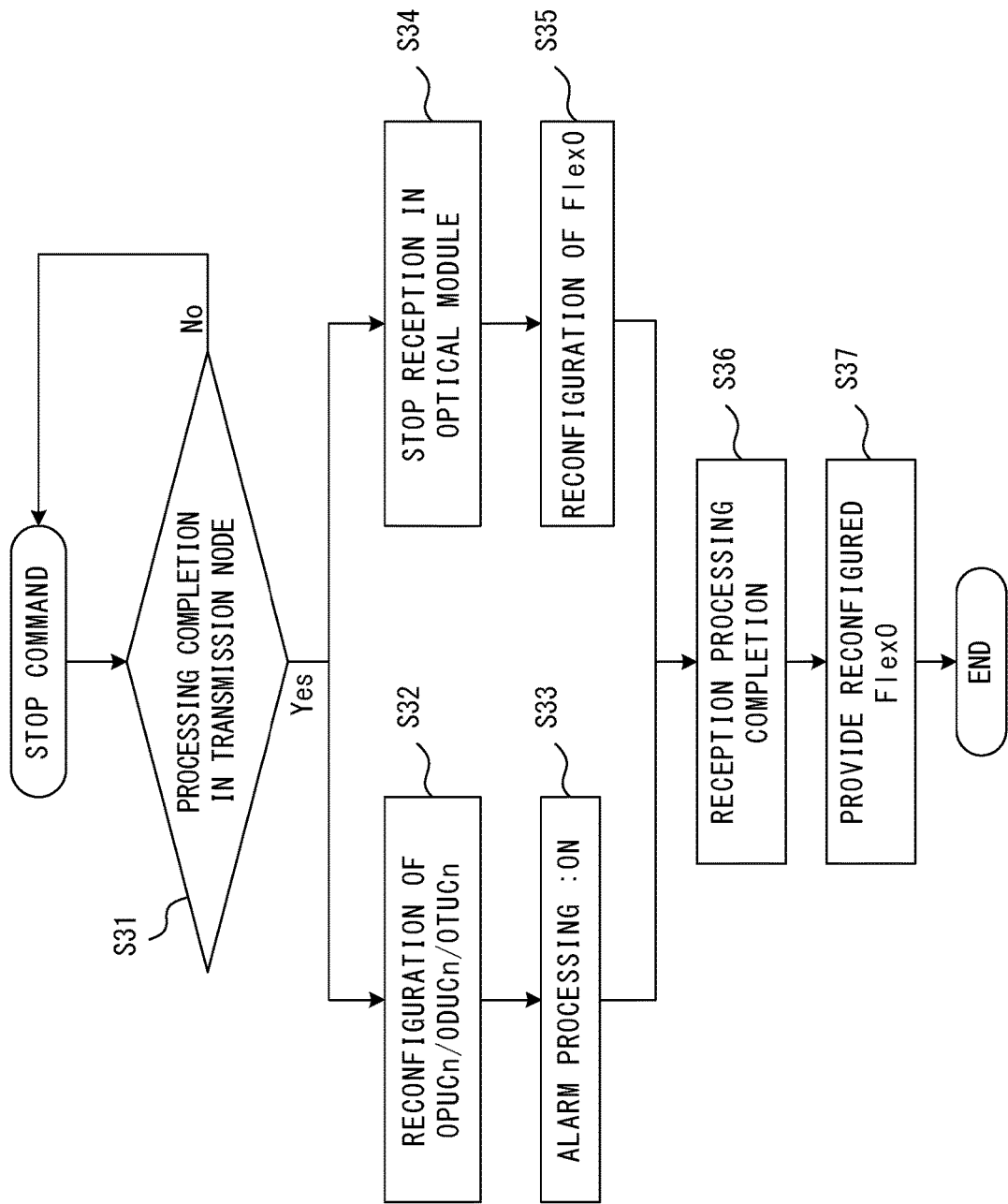

FIGS. 17 and 18 are flowcharts illustrating an example of a procedure of updating a set of optical transmission devices. FIG. 17 illustrates operation of the optical transmission device for transmitting the frame, and FIG. 18 illustrates operation of the optical transmission device for receiving the frame. In the following description, the optical transmission device for transmitting the frame may be called a "transmission node". The optical transmission device for receiving the frame may be called a "reception node".

In FIG. 17, when a stop command is given, in S21, the transmission node determines whether or not to be acceptable to stop an optical module. When it is not acceptable to stop the optical module within a specified time after being given the stop command, for example, an error message is generated.

When it is possible to stop the optical module, the transmission node selects a client signal in S22 and S23. When it is not possible to select the client signal within a specified time after being given the stop command, for example, an error message is generated. In S24, the transmission node reconfigures ODUCn/OTUCn. In other words, ODUCh/OTUCh is configured. As a result, reconfiguration of OPUCn/ODUCn/OTUCn is completed (S25).

In S26, the transmission node reconfigures FlexO. In S27, the transmission node stops the optical module. In S28, the transmission node determines whether or not update processing is completed in the reception node. For example, when processing of S36 illustrated in FIG. 18 is finished, it is determined that the update processing is completed in the reception node. When the update processing is completed in the reception node, in S29, the transmission node provides reconfigured FlexO.

In FIG. 18, when a stop command is given, in S31, the reception node determines whether or not update processing in the transmission node is completed. For example, when the processing in S27 illustrated in FIG. 17 is finished, it is determined that the update processing is completed in the transmission node. In addition, when completion of the update processing in the transmission node is not ascertained within a specified time after being given the stop command, for example, an error message is generated.

When the update processing is completed in the transmission node, in S32, the reception node reconfigures OPUCn/ODUCn/OTUCn. In S33, the reception node sets alarm processing at an ON state. In S34, the reception node stops reception of an optical module. In S35, the reception node reconfigures FlexO. As a result, reception processing is completed (S36). Subsequently, in S37, the reception node provides reconfigured FlexO.

Note that, in the embodiment illustrated in FIGS. 7 to 18, when a set of optical transmission devices is updated, the stop command is provided to each of the optical transmission devices (transmission node, reception node), but the present invention is not limited to the procedure. In other words, one of the optical transmission devices may be provided with the stop command, and subsequently, forward the stop command to the other optical transmission device.

Figure 19:
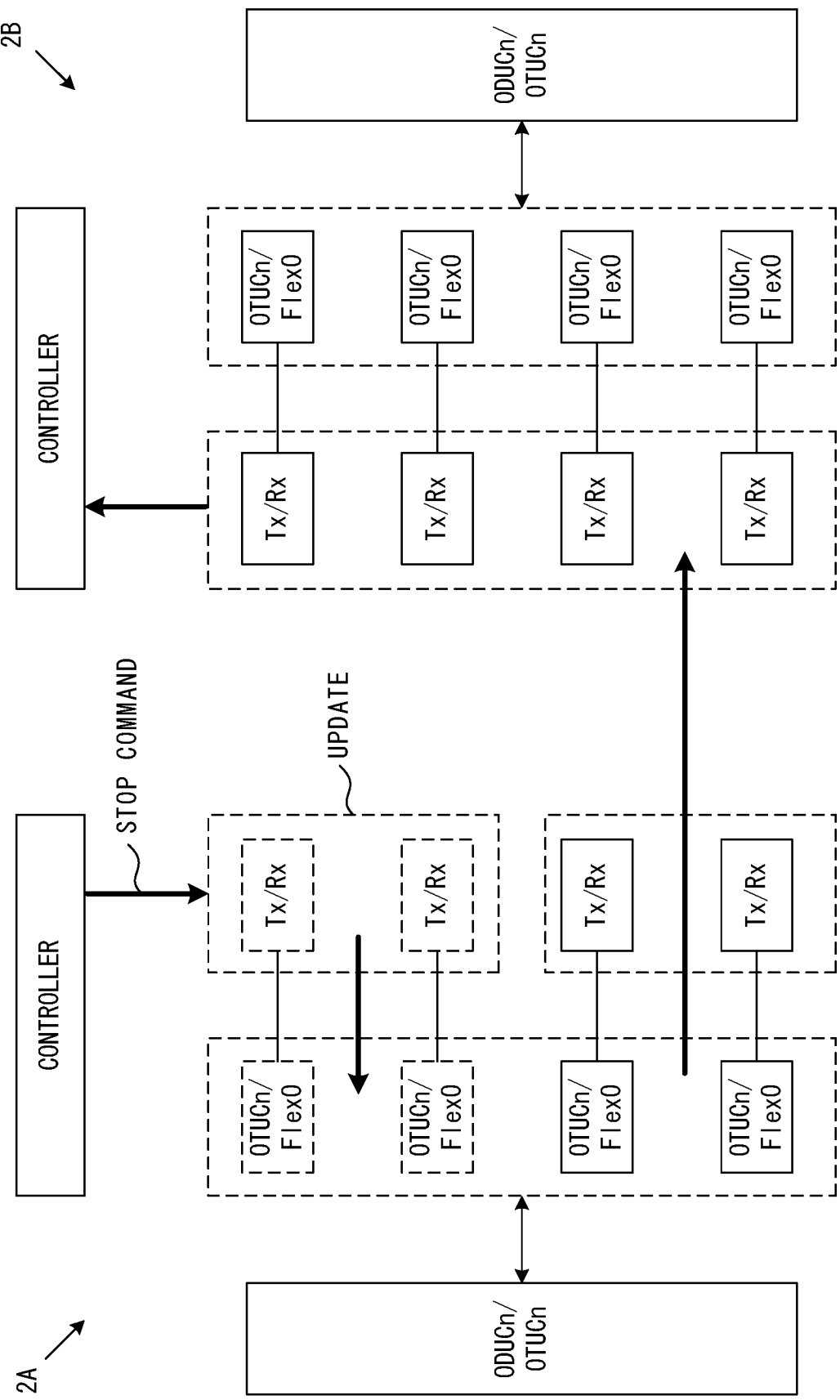
FIG. 19 illustrates an example of collaborated operation for updating a set of optical transmission devices.

FIG. 19 illustrates an example of collaborated operation for updating a set of optical transmission devices. In this example, a set of optical transmission devices 2A and 2B are bi-directionally connected via a network. Each of the optical transmission devices 2A and 2B is capable of transmitting FlexO frames with n=4. In other words, four FlexO frames are transmitted in parallel between the optical transmission devices 2A and 2B.

The optical transmission device 2A is provided with a stop command. The stop command includes an instruction that two transceivers among four transceivers (Tx/Rx) are stopped. Then, by the stop command, the designated two transceivers are stopped. Further, corresponding two OTUC/FlexO processors halt operation, while remaining two OTUC/FlexO processors keep active states. Then, the optical transmission device 2B is notified of information for identifying the two OTUC/FlexO processors in active states in the optical transmission device 2A.

The optical transmission device 2B detects the two OTUC/FlexO processors in active states in the optical transmission device 2A. Accordingly, the optical transmission device 2B can perform the update processing similar to that of the optical transmission device 2A.

Figure 20:
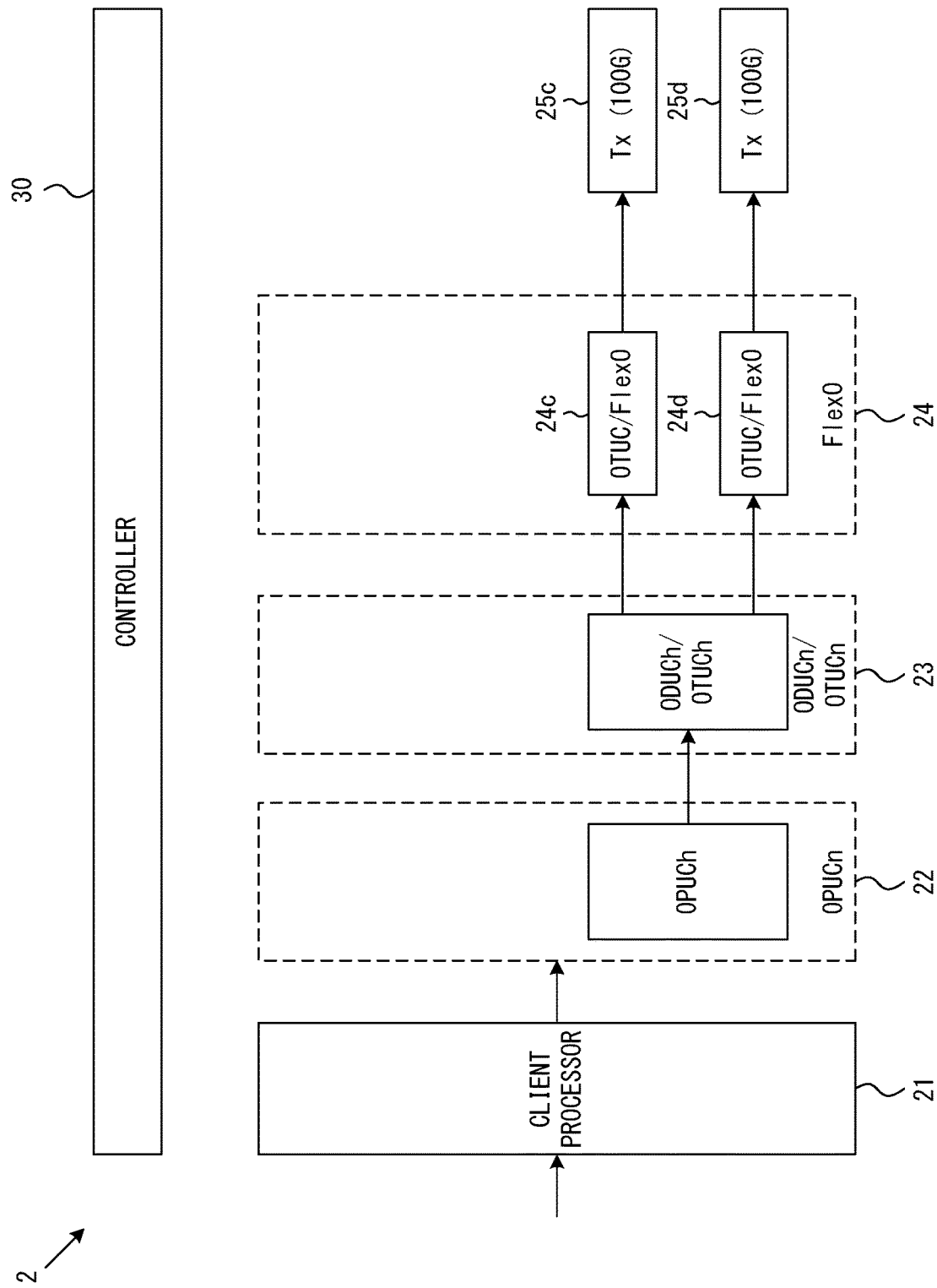
FIGS. 20-23 illustrate another example of the procedure of updating the optical transmission device.

FIGS. 20 to 23 illustrate another example of the procedure of updating the optical transmission device. FIG. 20 illustrates a state of the optical transmission device at the time of finishing the procedure illustrated in FIGS. 7 and 8. Specifically, the transceivers 25a and 25b are removed among four transceivers 25a to 25d provided in the optical transmission device 2. The OPUCn processor 22 generates an OPUCh (h=2) frame. The ODUCn/OTUCn processor 23 generates an OTUCh (h=2) frame. The FlexO processor 24 generates two FlexO frames. Then, the transceivers 25c and 25d transmit the FlexO frames, respectively.

Figure 21:
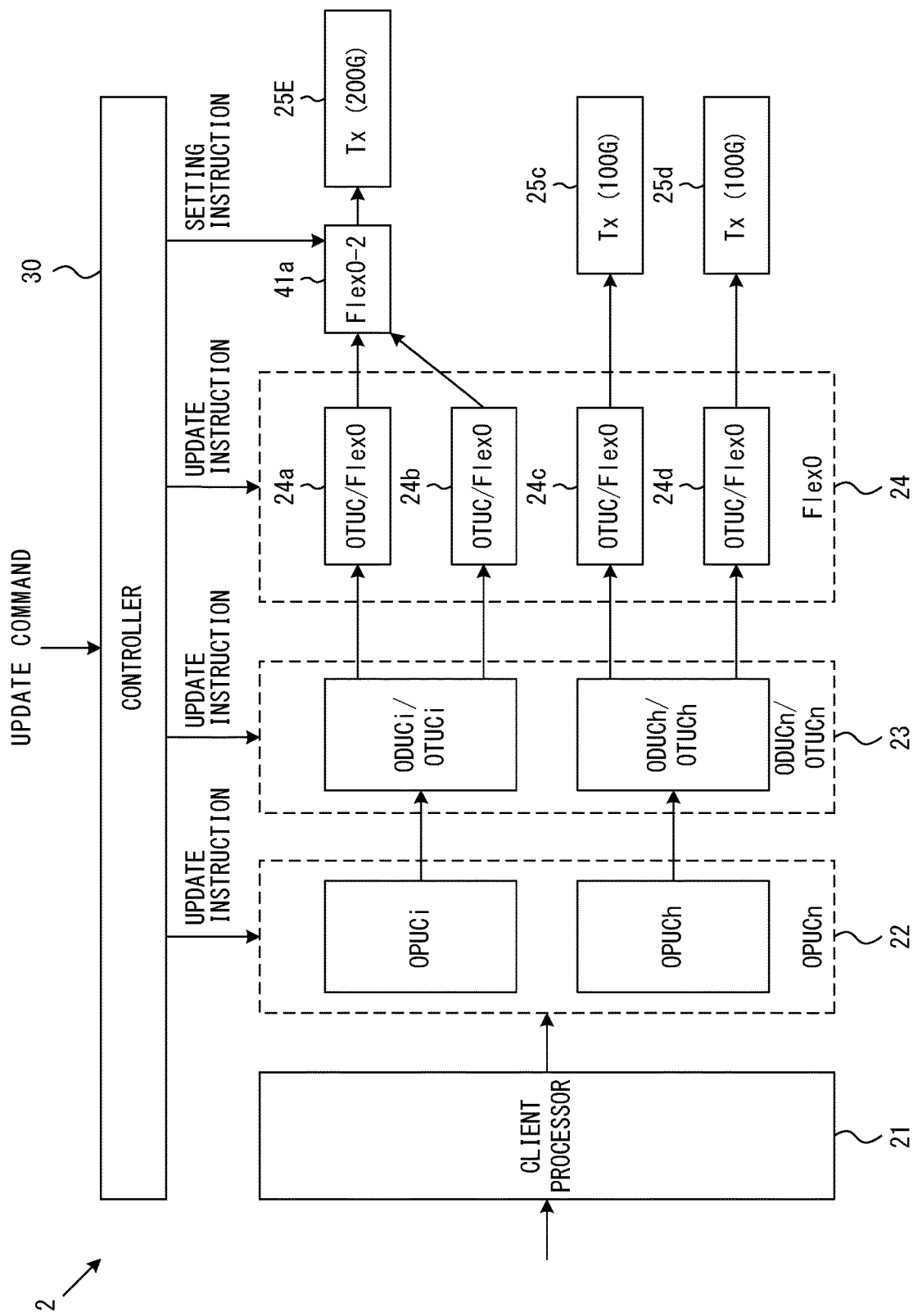

In the above-mentioned state, as illustrated in FIG. 21, the controller 30 of the optical transmission device 2 is provided with an update command. The update command indicates a start of FlexO-2. At this point, as a substitute for the transceivers 25a and 25b illustrated in FIG. 7, a transceiver 25E is assumed to be attached. The transceiver 25E is capable of transmitting a 200G signal.

Corresponding to the update command, the controller 30 gives update instructions to the ODUCn/OTUCn processor 23 and FlexO processor 24. Then, corresponding to the update instructions, the ODUCn/OTUCn processor 23 makes setting to generate an OTUCi frame. In this embodiment, i=h=2 holds. Further, the FlexO processor 24 makes setting to generate two FlexO frames from the OTUCi frame and generate two FlexO frames from an OTUCh frame. Furthermore, a FlexO-2 processor 41a is generated. The FlexO-2 processor 41a is capable of combining two FlexO frames to generate one FlexO-2 frame. Moreover, the FlexO-2 processor 41a generates Forward Error Correction FEC and adds it to the FlexO-2 frame.

When the above-mentioned update and setting is completed, the ODUCn/OTUCn processor 23 sends a continuity check signal to the controller 30. Then, the controller 30 gives a mapping switching instruction to the OPUCn processor 22. The mapping switching instruction indicates switching from a state of transmitting two FlexO frames to a state of transmitting four FlexO frames. For example, when the memory 32 stores the mapping table illustrated in FIG. 12, the switching instruction indicates switching from "update time" to "normal time". Then, according to the mapping information corresponding to the "normal time", the OPUCn processor 22 accommodates client signals into tributary slots TS #1 to TS #4.

When the above-mentioned update is completed, the client signals are accommodated into the tributary slots TS #1 to TS #4. Further, one FlexO-2 frame and two FlexO frames are generated. Then, the transceiver 25E transmits the FlexO-2 frame, and the transceivers 25c and 25d transmit the FlexO frames, respectively.

Figure 22:
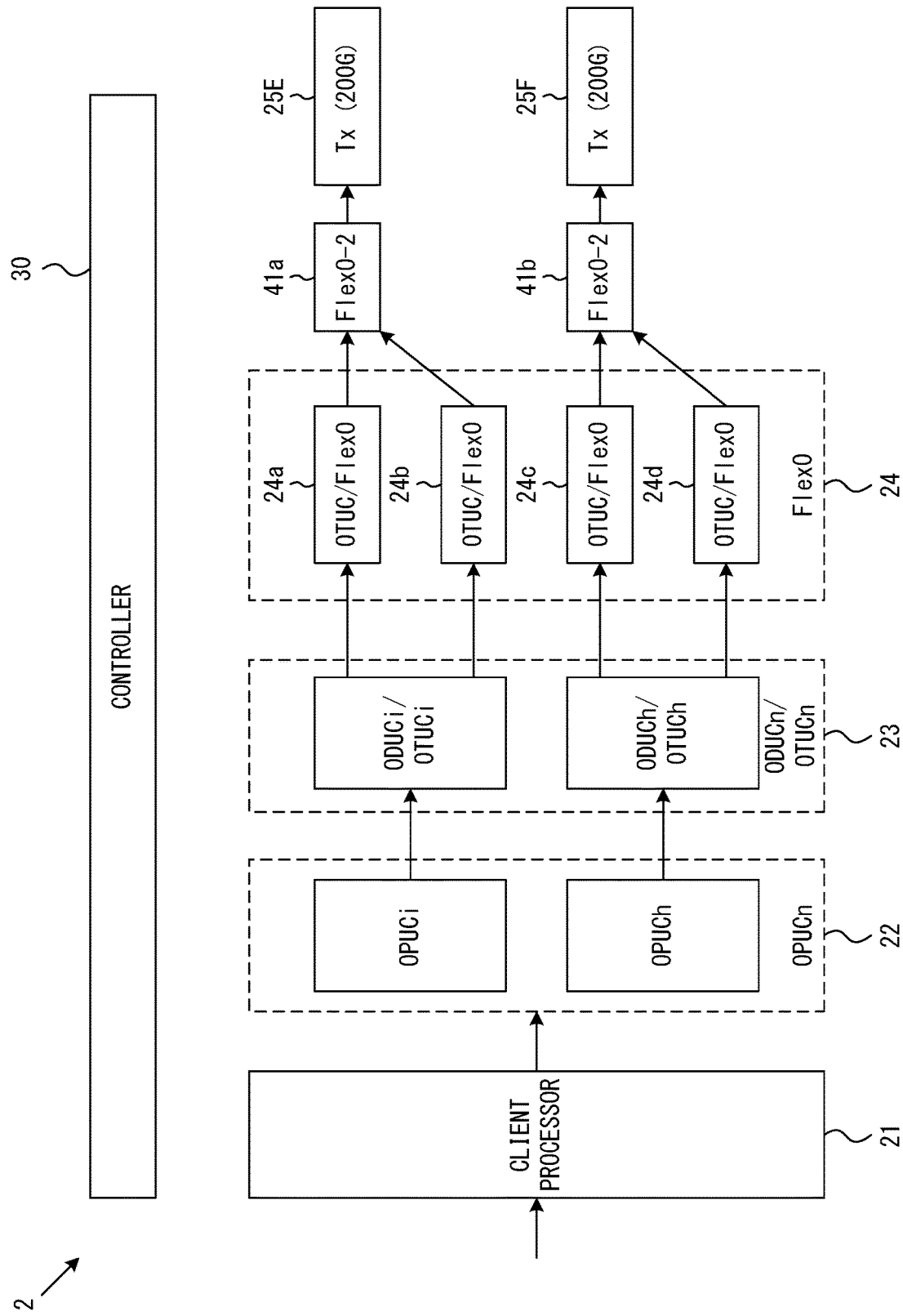

Next, as illustrated in FIG. 22, the transceivers 25c and 25d are replaced with a transceiver 25F. This procedure is substantially the same as the procedure of replacing the transceivers 25a and 25b with the transceiver 25E. That is, a part or all of client signals that have been accommodated in the OPUCh/ODUCh/OTUCh will be accommodated into OPUCi/ODUCi/OTUCi. Further, a FlexO-2 processor 41b is configured.

Figure 23:
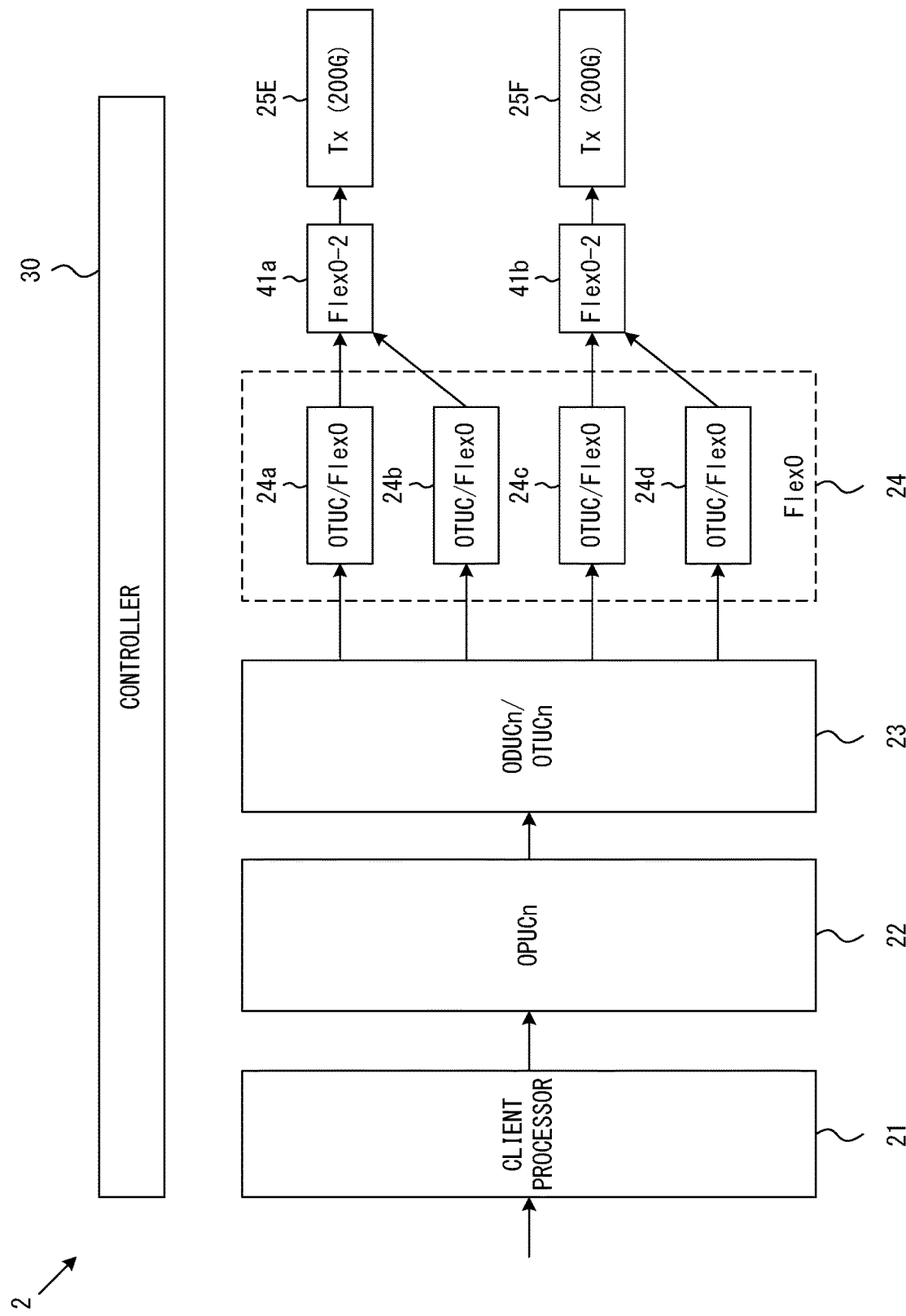

Subsequently, as illustrated in FIG. 23, the OPUCn processor 22 and ODUCn/OTUCn processor 23 are reconfigured. In other words, the OPUCn processor 22 is reconfigured from the state of generating the OPUCi frame and OPUCh frame to the state of generating the OPUCn frame. Further, the ODUCn/OTUCn processor 23 is reconfigured from the state of generating the OTUCi frame and OTUCh frame to the state of generating the OTUCn frame.

Thus, according to the embodiment of the present invention, in the communication system for transmitting traffic exceeding 100G in the OTN, without halting communication service, it is possible to update (i.e., upgrade) the optical transmission device. At this point, corresponding to a traffic amount of client signals, there is the case where all communication service is not continued. However, even in such a case, transmission is continued in client signals with high priorities. Accordingly, it is possible to sufficiently suppress the effect caused by halting the communication service at the time of updating the optical transmission device.

Note that, in operation up to herein, the embodiment is described where it is assumed that n=4, h=2, and that total 400 Gbps of transmission is performed, and with respect to n and h, when n>h, other values are applicable. Further, also with respect to FlexO-x, the embodiment according to update from x=1 (FlexO) to FlexO-2 is described, and it is also possible to support other cases, for example, such as x=4.

Further, in the above-mentioned embodiment, the optical transmission device is updated. Specifically, by replacing the 100G transceiver with the 200G transceiver, the number of ports is decreased, and wavelength usage efficiency is improved. In addition, the embodiment of the present invention is also applicable to additional installation of the optical transmission device.

Figure 24:
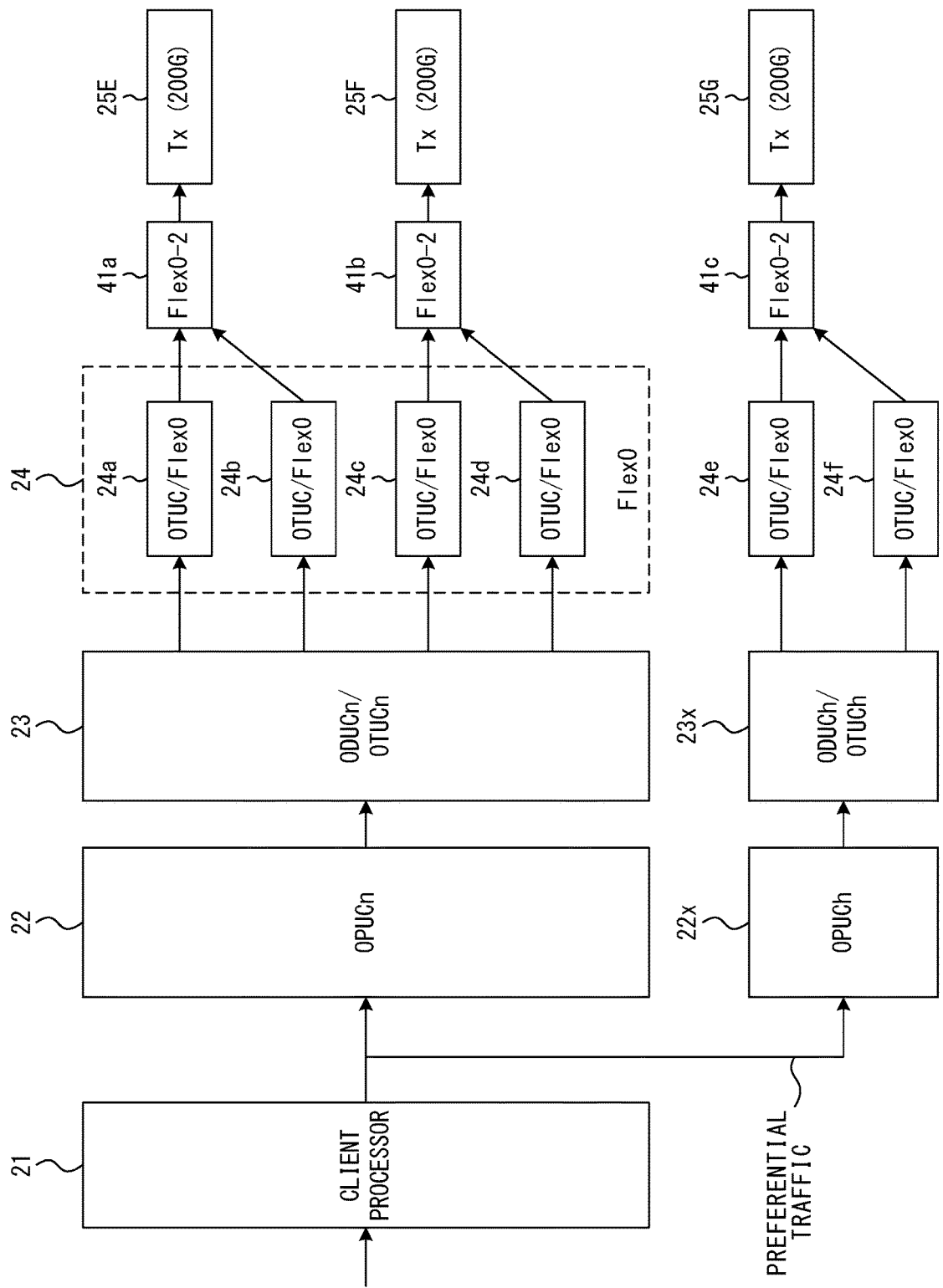
FIG. 24 illustrates an example of additional installation of the optical transmission device.

FIG. 24 illustrates an example of additional installation of the optical transmission device. In this embodiment, a transceiver 25G is added to the configuration illustrated in FIG. 23. In other words, the capacity of the optical transmission device is increased from 400G to 600G. In this case, an OPUCh (h=2) processor 22x is added to the OPUCn (n=4) processor 22. Alternatively, the OPUCn (n=4) processor 22 may be reconfigured to an OPUCn (n=6) processor.

Further, an ODUCh/OTUCh (h=2) processor 23x is added to the ODUCn/OTUCn (n=4) processor 23. Alternatively, the ODUCn/OTUCn (n=4) processor 23 may be reconfigured to an ODUCn/OTUCn (n=6) processor. Anyway, the optical transmission device is provided with FlexO processors 24a to 24f, and further, provided with FlexO-2 processors 41a to 41c.

When the total band of client signals is 400 Gbps or less, 1+1 protection may be actualized. For example, client signals (preferential traffic) with high priorities among input client signals are guided to the OPUCn processor 22, while being copied and guided also to the OPUCh processor 22x. Herein, the preferential traffic is limited to 200G or less. Then, a frame output from the OPUCn processor 22x is processed by the ODUCh/OTUCh processor 23x, FlexO processors 24e and 24f and FlexO-2 processor 41c, and is output to the network by the transceiver 25G. In this configuration, the preferential traffic is transmitted to the reception node via two different paths. Accordingly, transmission with high reliability is actualized.

Other Embodiment

In the above-mentioned embodiments, update of the optical transmission device is actualized by using FlexO. Herein, the FlexO is extension of the OTU, and supports transmission on one link for connecting between mutually adjacent nodes. However, the main entity for transmitting the client signal is the ODU, and in End-End in the OTN network, the client signal is usually transmitted via a plurality of links. Thus, in the other embodiment, the present invention is applied to a configuration for transmitting a signal via a plurality of links.

Figure 25:
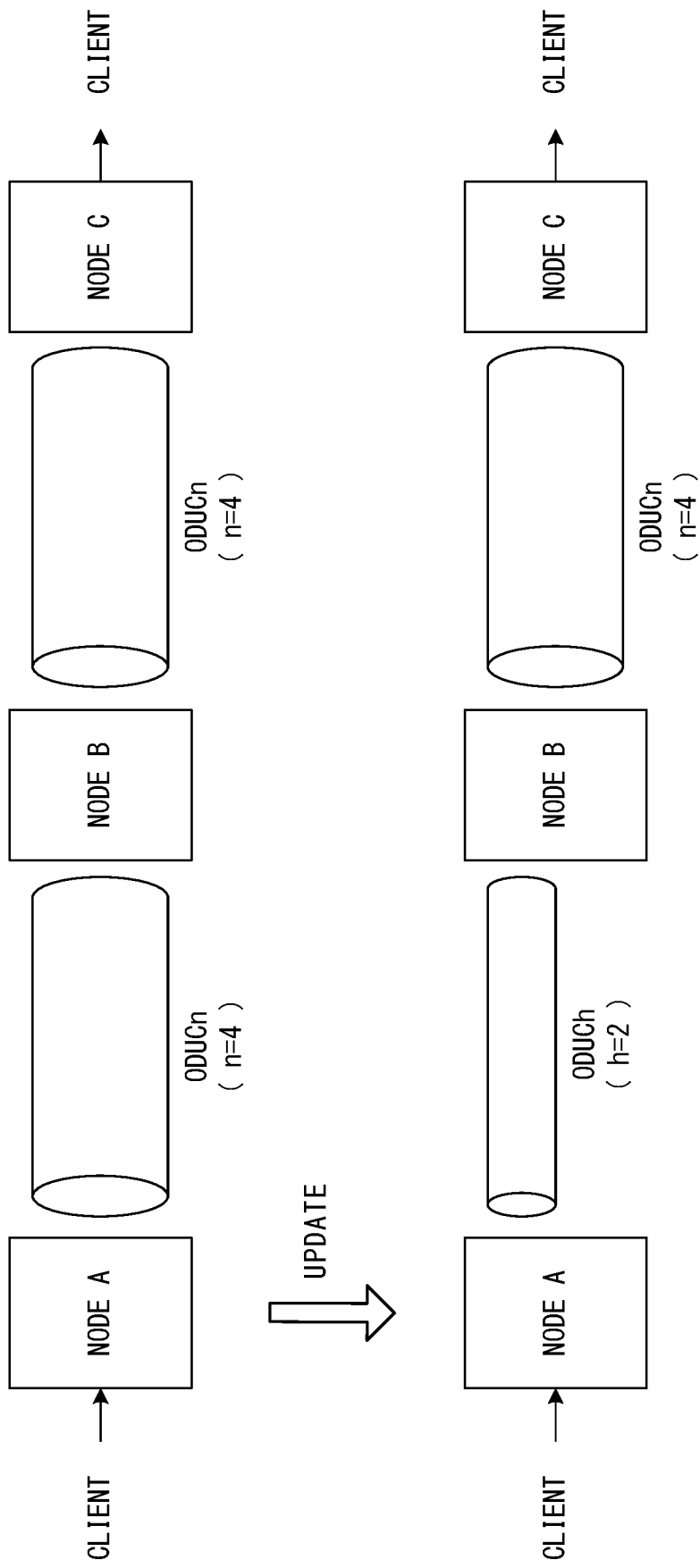
FIG. 25 illustrates an example of an END-END path.

FIG. 25 illustrates an example of an END-END path. In this example, a client accommodated in a node A and another client accommodated in a node C perform communication via a node B. Further, ODUCn (n=4) is configured between the nodes. Herein, it is assumed that the optical transmission device implemented in the node A is updated according to the procedure illustrated in FIGS. 7 and 8. As an example, ODUCh (h=2) is configured between the nodes A and B. Note that the path between the nodes B and C is still ODUCn (n=4).

In this case, unless the node B is provided with the switching function (or, ODU cross-connect), there is the case where communication between the clients is disconnected. Further, the existing OTN network sometimes includes a node without being provided with the switching function. Thus, a procedure according to the other embodiment of the present invention enables the ODUCn path and ODUCh path to be connected, without disconnecting communication between clients, even when the switching function is not used in each node on the path.

In the following description, the optical transmission device implemented in a node i may be called a "node device i". For example, in the example illustrated in FIG. 25, the node devices A to C represent optical transmission devices implemented in the nodes A to C, respectively.

In the case of performing update illustrated in FIG. 25, the node device A transmits control information including the client information and mapping table illustrated in FIG. 12 to the node device B. For example, the control information is stored in overhead of a frame. Specifically, the control information may be transmitted using GCC (General Communication Channel) defined in ITU-T standard G.709.

The node device B connects between the ODUCh path and the ODUCn path illustrated in FIG. 25, using the mapping table received from the node device A. Specifically, the node device B extracts an OPUCh frame from the received frame, and extracts a tributary slot TS from each OPUC frame. Further, according to the mapping table, the node device B performs mapping (i.e., reallocation) of the tributary slot TS. Then, the node device B generates an OPUCn (n=4) frame in which the tributary slot TS is reallocated, and further, generates an ODUCn (n=4) frame. At this point, the ODU overhead takes over overhead extracted from the received ODU frame. Subsequently, the node device B generates an OTN frame to be transmitted to the node device C.

Figure 26:
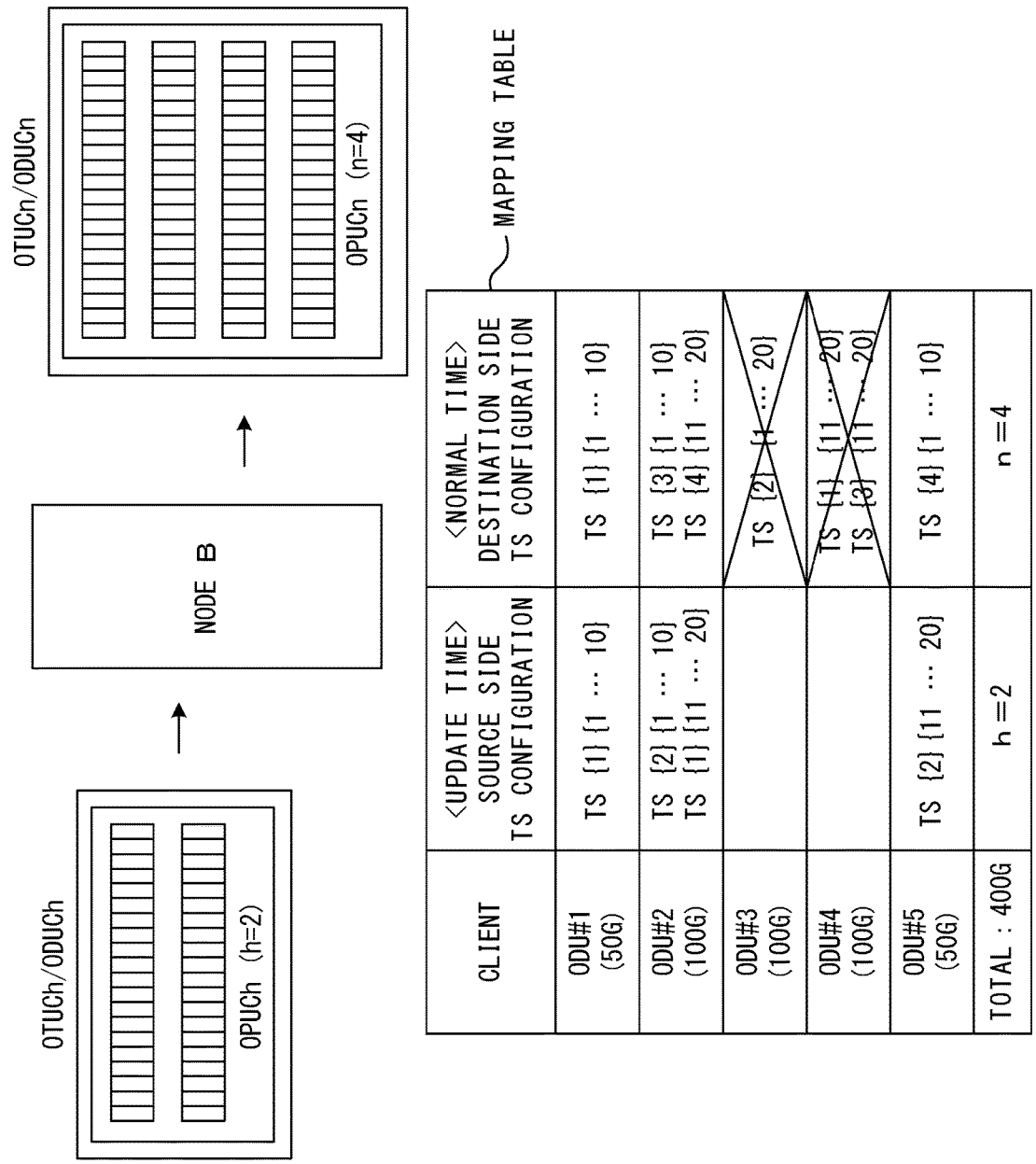
FIG. 26 illustrates an outline of processing for forwarding a frame using a mapping table.

FIG. 26 illustrates an outline of processing for forwarding a frame using a mapping table. In this example, the node device B uses the mapping table received from the node A, and connects between the ODUCh (h=2) path and the ODUCn (n=4) path illustrated in FIG. 25.

The node device B extracts an ODUCh (h=2) frame from the received OTU frame, and extracts an OPUCh frame from the ODUCh frame. Then, according to the mapping table, the node device B reallocates the tributary slot TS. At this point, information on "Update time" in the mapping table is used as source side TS configuration information, and information on "Normal time" in the mapping table is used as destination side TS configuration information.

In updating the node device A, a client signal is transmitted from the node device A to the node device B using the tributary slot TS indicated by the source side TS configuration information. Then, the node device B maps the tributary slot TS indicated by the source side TS configuration information into the tributary slot TS indicated by the destination side TS configuration information. Here, two OPUs are configured on the path between the nodes A and B, and the node device A selects only a part of client signals. Accordingly, the node device B maps only the client signal selected in the node device A into the tributary slot TS on the destination side.

Specifically, the node device A selects client signals ODU #1, ODU #2 and ODU #5 from among client signals ODU #1 to ODU #5. In other words, the node device A does not transmit client signals ODU #3 and ODU #4 to the node device B. Accordingly, the node device B maps only the client signals ODU #1, ODU #2 and ODU #5 selected in the node device A into the tributary slot TS on the output side.

Figure 27A:
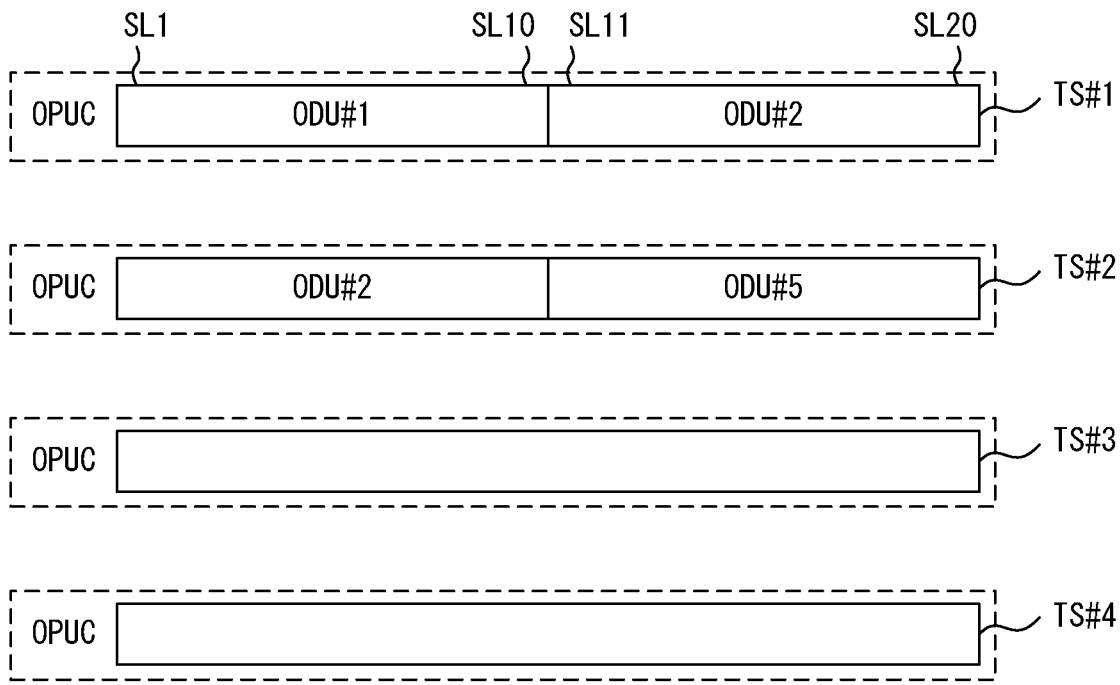
FIGS. 27A and 27B illustrate an example of mapping based on TS configuration information illustrated in FIG. 26.

For example, it is assumed that the node device A performs mapping illustrated in FIGS. 13A and 13B. In this case, according to the mapping table received from the node device A, the node device B performs mapping (i.e., reallocation of the tributary slot TS) illustrated in FIGS. 27A and 27B. Specifically, the node device B receives tributary slots TS #1 and TS #2 illustrated in FIG. 27A, and outputs tributary slots TS #1 to TS #4 illustrated in FIG. 27B. At this point, the client signal ODU #1 stored in slots SL1 to SL10 of the tributary slot TS #1 on the source side is mapped into slots SL1 to SL10 of the tributary slot TS #1 on the destination side. The client signal ODU #2 stored in slots SL1 to SL10 of the tributary slot TS #2 on the source side is mapped into slots SL1 to SL10 of the tributary slot TS #3 on the destination side. The client signal ODU #2 stored in slots SL11 to SL20 of the tributary slot TS #1 on the source side is mapped into slots SL11 to SL20 of the tributary slot TS #4 on the destination side. The client signal ODU #5 stored in slots SL11 to SL20 of the tributary slot TS #2 on the source side is mapped into slots SL1 to SL10 of the tributary slot TS #4 on the destination side.

Figure 28:
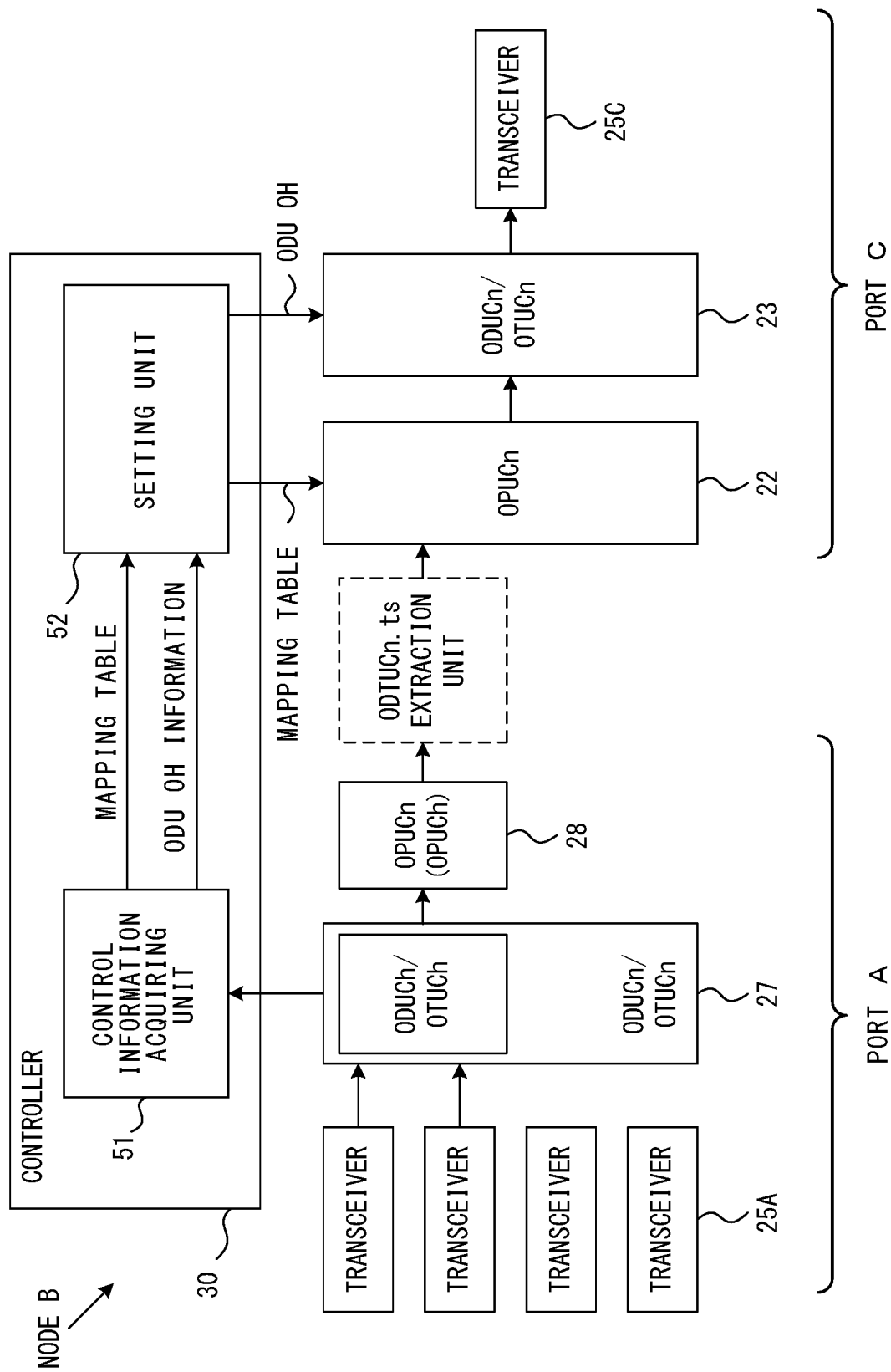
FIG. 28 illustrates an example of a node device for connecting between an ODUCn path and an ODUCh path.

FIG. 28 illustrates an example of the node device for connecting between an ODUCn path and an ODUCh path.

Herein, a configuration of the node device B is substantially the same as that of the optical transmission device 2 illustrated in FIG. 2. However, the node device B is provided with at least two ports (port A and port C). The port A has functions of connecting to the node device A and processing FlexO. The port C has functions of connecting to the node device C, and forwarding traffic exceeding 100G using techniques other than FlexO.

As illustrated in FIG. 25, the node device B receives an ODUCh (h=2) frame from the node device A. The ODUCh frame is terminated by the port A. Further, the node device B transmits an ODUCn (n=4) frame to the node device C. The ODUCn frame is transmitted via the port C.

The node device B is provided with four transceivers 25A. In addition, in this embodiment, two transceivers among four transceivers 25A receive FlexO frames. The ODUCn/OTUCn processor 27 extracts an OTU frame from the FlexO frame, and extracts an ODU frame from the OTU frame. In addition, the ODUCn/OTUCn processor 27 operates as an ODUCh/OTUCh processor.

A control information acquiring unit 51 acquires a mapping table stored in overhead of the received frame. For example, in the case where the node device A transmits a mapping table using the GCC of the ODU frame, the control information acquiring unit 51 acquires the mapping table from the GCC. Further, the control information acquiring unit 51 acquires overhead (hereinafter, ODU overhead) of the ODU frame. A setting unit 52 is provided with the mapping table and ODU overhead acquired by the control information acquiring unit 51.

The OPUCn processor 28 extracts an OPU frame from the ODU frame. Further, an ODTUCn.ts frame is extracted from the OPU frame. In other words, the client signal stored in each slot SL of each tributary slot TS is extracted. In the example illustrated in FIG. 27A, the client signal stored in each slot SL of tributary slots TS #1 and TS #2 is extracted. Note that the OPUCn processor 28 operates as an OPUCh processor.

The setting unit 52 sets the mapping table acquired by the control information acquiring unit 51 on the OPUCn processor 22. Further, the setting unit 52 provides the ODUCn/OTUCn processor 23 with the ODU overhead acquired by the control information acquiring unit 51.

Figure 27B:
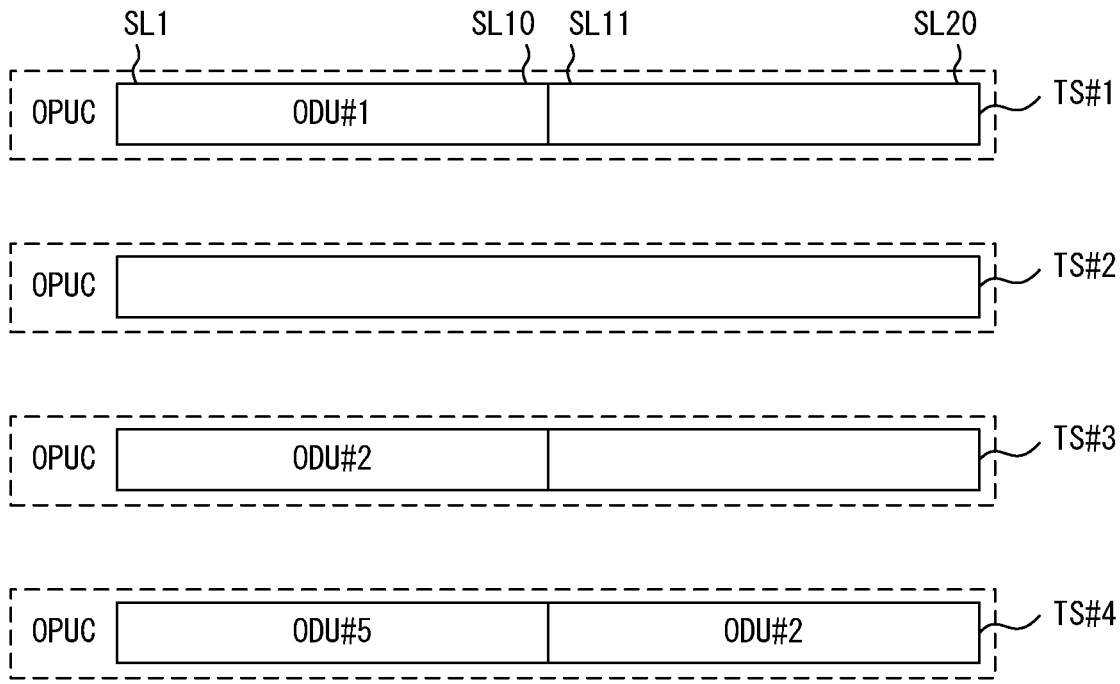

According to the mapping table, the OPUCn processor 22 performs reconfiguration of tributary slots. For example, reconfiguration illustrated in FIGS. 26 to 27B is performed. Specifically, the tributary slots TS #1 and TS #2 indicated by the source side TS configuration information are allocated to tributary slots TS #1 to TS #4 indicated by the destination side TS configuration information. In this case, four OPU frames are generated.

The ODUCn/OTUCn processor 23 adds the ODU overhead to the OPU frame, and thereby generates an ODU frame. The ODU overhead takes over contents of the ODU overhead extracted from the received frame. Further, the ODUCn/OTUCn processor 23 adds OTU overhead to the ODU frame, and thereby generates an OTU frame. The transceiver 25C transmits the OTU frame to the node device C.

As described above, when the node device A performs update from the configuration for accommodating the ODUCn path to the configuration for accommodating the ODUCh path, the node device B receives the mapping table indicative of conversion between the ODUCn path and the ODUCh path from the node device A. Then, the node device B performs reallocation of the tributary slot TS using the mapping table, and thereby actualizes connection between the ODUCh path and the ODUCn path. Accordingly, even when the node device B is not provided with the switching function based on the control information to forward the client signal in End-End, the device B can connect between the ODUCh path and the ODUCn path. Further, since it is not necessary to install the switching function, it is possible to reduce circuits of the optical transmission device.

Figure 29:
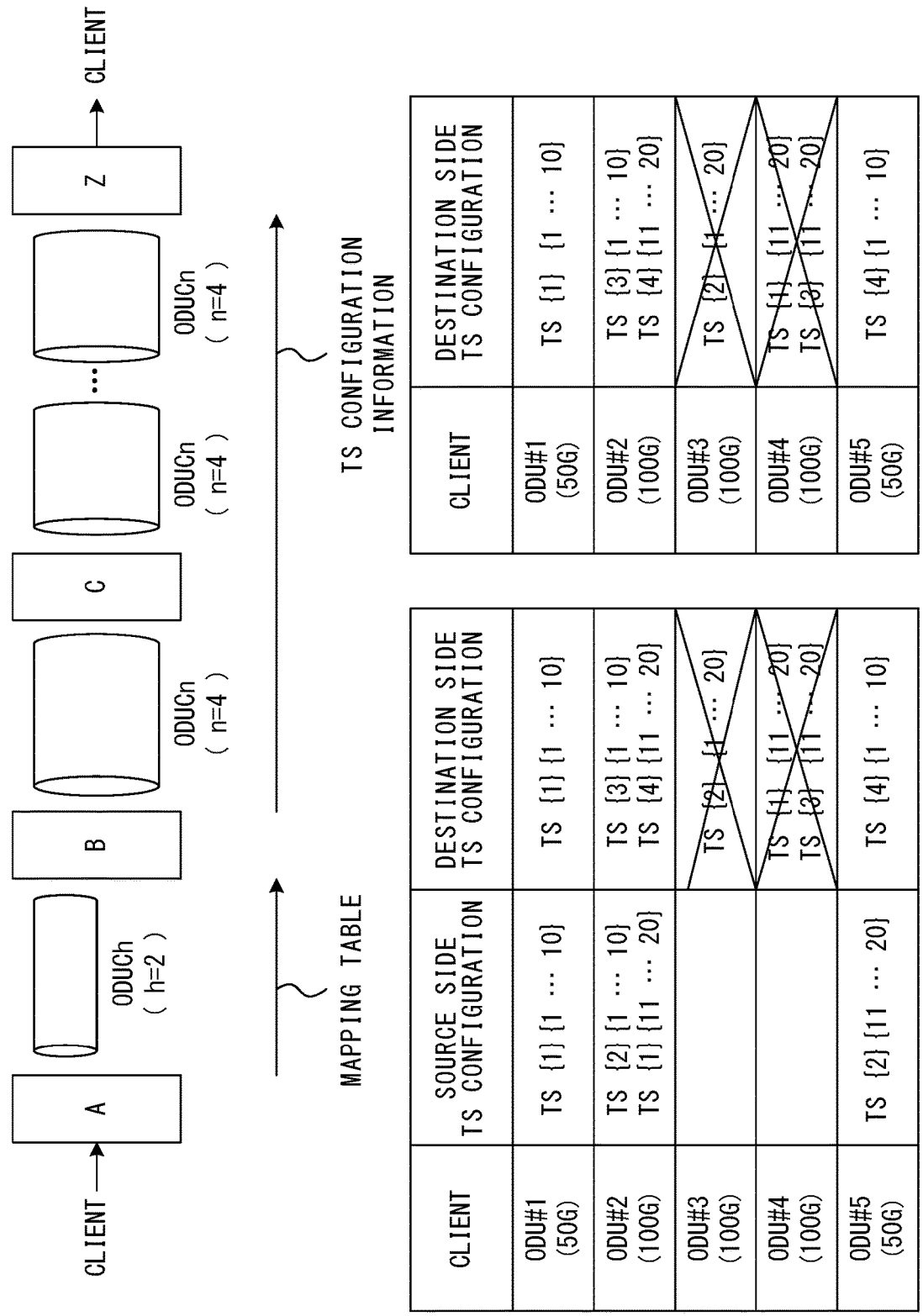
FIG. 29 illustrates an example of a network where three or more node devices are connected in cascade.

FIG. 29 illustrates an example of a network where three or more node devices are connected in cascade. In this embodiment, node devices A, B, C, . . . Z are connected sequentially. Then, the node device A is updated by the procedure illustrated in FIGS. 7 and 8. As an example, the ODUCh (h=2) path is established between the nodes A and B. Further, paths among nodes B to Z are still ODUCn (n=4).

As described with reference to FIGS. 26 to 28, the node device A transmits the mapping table to the node device B. Then, according to the mapping table, the node device B performs reallocation of the tributary slot TS. By this means, the node device B connects between the ODUCh path and the ODUCn path.

ODUCn paths are established between the node devices B to Z. In other words, each node device (node device C and so on in FIG. 29) provided between the node devices B to Z performs normal frame forwarding. Accordingly, in forwarding the frame, each node device provided between the node devices B to Z does not need the mapping table that is notified the node device B from the node device A. However, a node device (node device Z in FIG. 29) for accommodating the destination client terminates the ODUCn, and therefore, preferably recognizes the configuration of the tributary slot TS. Accordingly, the node device B receiving the mapping table from the node device A generates TS configuration information (i.e., destination side TS configuration information) indicative of the configuration of the tributary slot TS used between the node device B and the node device Z and transmits it to the node device Z.

In this case, the node device B updates the destination side TS configuration information received from the node device A when necessary, and thereby generates the destination side TS configuration information to be transmitted to the node device Z. For example, when all client signals are selected in the node device A, the node device B may transmit the destination side TS configuration information received from the node device A to the node device Z without any modification. Further, when a part of client signals is selected in the node device A, the node device B may generate TS configuration information indicative of the configuration of the tributary slot TS for accommodating the client signal selected in the node device A. In other words, the node device B may generate the TS configuration information indicative of the configuration of the tributary slot TS for accommodating the client signal to be forwarded to the node device Z. In the example illustrated in FIG. 29, the node device B transmits the TS configuration information indicative of the configuration of tributary slots for accommodating the client signals ODU #1, ODU #2 and ODU #5 to the node device Z.

The destination side TS configuration information indicates the tributary slot TS used in transmitting the client signal. In the example illustrated in FIG. 29, the destination side TS configuration information includes information indicating that "the client signal ODU #1 is allocated to the slots SL1 to SL10 of the tributary slot TS #1", "the client signal ODU #2 is allocated to the slots SL1 to SL10 of the tributary slot TS #3 and to the slots SL11 to SL20 of the tributary slot TS #4", and "the client signal ODU #5 is allocated to the slots SL1 to SL10 of the tributary slot TS #4". In addition, the node device B may transmit the mapping table (source side TS configuration information and destination side TS configuration information) to the node device Z.

For example, the TS configuration information (or, the mapping table) is transmitted using the above-mentioned GCC. Then, based on the TS configuration information, the node device Z extracts the client signal from the tributary slot TS to be forwarded to the corresponding client. Further, based on the TS configuration information, the node device Z can detect a mismatch between tributary slots.

In addition, in the OTN network, in many cases, data is transmitted between End-End bidirectionally. In other words, the node device Z transmits a frame to the node device A. Herein, it is assumed that the client information illustrated in FIG. 12 is set on the node device Z. Further, based on the TS configuration information received from the node device B, the node device Z recognizes the transmission capacity between the node device A and the node device B at the time of updating the node device A. In this embodiment, the transmission capacity is 200G. Then, based on the client information and transmission capacity, the node device Z selects client signals capable of being transmitted from the node device Z to the node device A. A procedure of selecting the client signal is substantially the same as the procedure illustrated in FIG. 14.

The node device Z generates TS configuration information indicative of the tributary slot TS for accommodating the selected client signal. The TS configuration information is applied to paths from the node device Z to the node device B, and therefore, is sometimes called "TS configuration information (Z→B)" in the following description. FIG. 30 illustrates one example of the TS configuration information (Z→B).

When the node device Z receives the mapping table from the node device B, the node device Z is capable of recognizing the configuration of the tributary slot TS between the node device A and the node device B. In this case, in addition to the TS configuration information (Z→B), the node device Z may generate TS configuration information (B→A) indicative of the configuration of the tributary slot TS between the node device A and the node device B. FIG. 30 illustrates one example of the TS configuration information (B→A).

Figure 31:
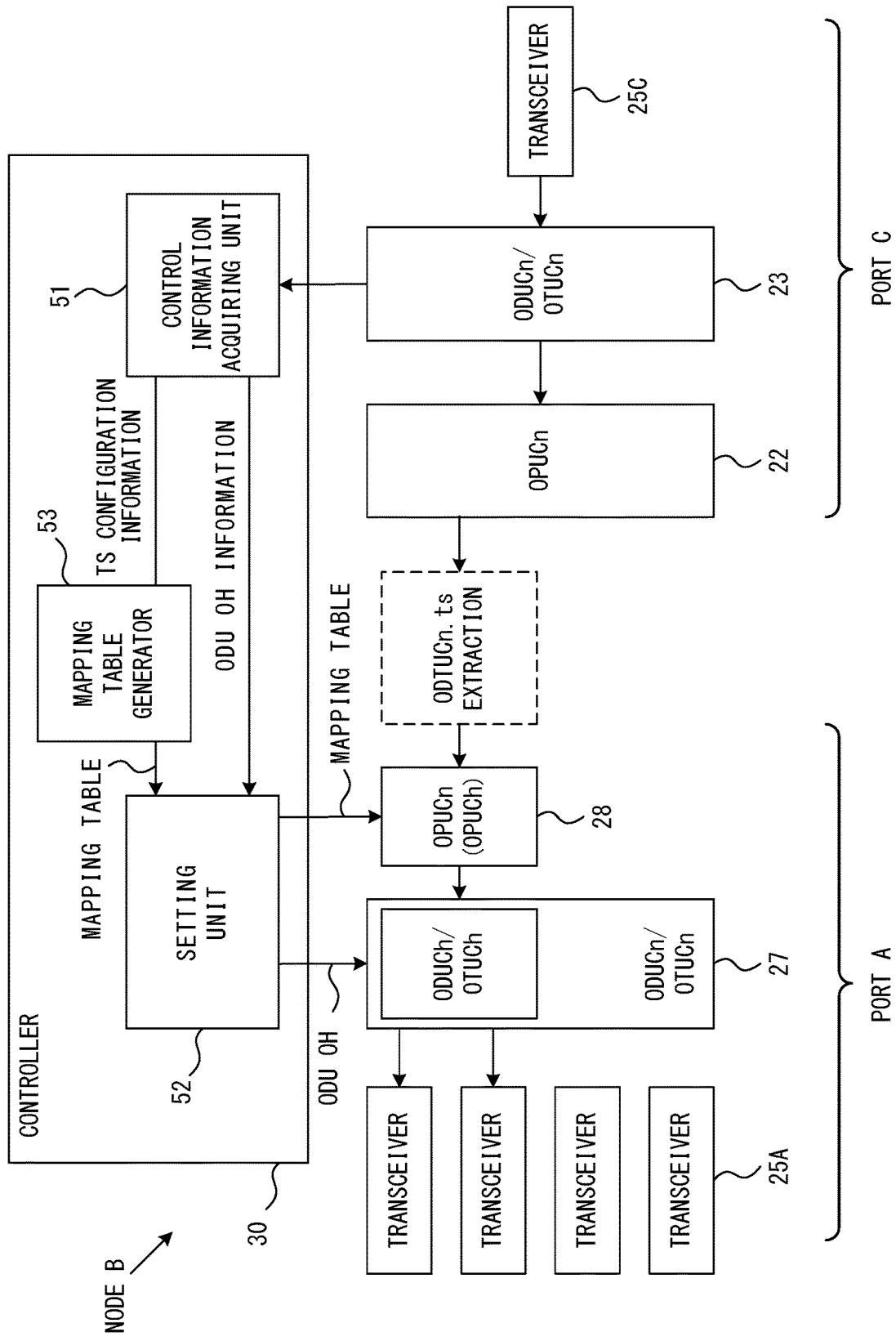
FIG. 31 illustrates another example of the node device for connecting between the ODUCn path and the ODUCh path.

FIG. 31 illustrates another example of the node device for connecting between the ODUCn path and the ODUCh path. In the example, the node device Z transmits the TS configuration information (Z→B) illustrated in FIG. 30 to the node device B. For example, the TS configuration information (Z→B) is transmitted using the GCC. Note that each node device provided between the node devices Z to B forwards the TS configuration information (Z→B) to the next device, without using it.

In the node device B, the control information acquiring unit 51 acquires the TS configuration information (Z→B) transmitted from the node device Z. Herein, as illustrated in FIG. 29, the node device B has received the mapping table from the node device A. In other words, the node device B recognizes the configuration of the tributary slot TS between the node device A and the node device B. Accordingly, based on the TS configuration information (Z→B), a mapping table generator 53 can generate a mapping table to connect between the ODUCn path and the ODUCh path for transmitting the client signal from the node device Z to the node device A. Then, the mapping table is set on the OPUCn processor 28 by the setting unit 52. Further, the control information acquiring unit 51 acquires overhead (hereinafter, ODU overhead) of the ODU frame. Then, the setting unit 52 provides the ODUCn/OTUCn processor 27 with the ODU overhead.

Frame conversion illustrated in FIG. 31 is substantially the same as operation illustrated in FIG. 28. In other words, according to the mapping table set by the setting unit 52, the OPUCn processor 28 reconfigures the tributary slot TS. Further, the ODUCn/OTUCn processor 27 adds the ODU overhead provided from the setting unit 52 to an output frame of the OPUCn processor 28, and thereby generates the ODUCn frame.

Figure 32:
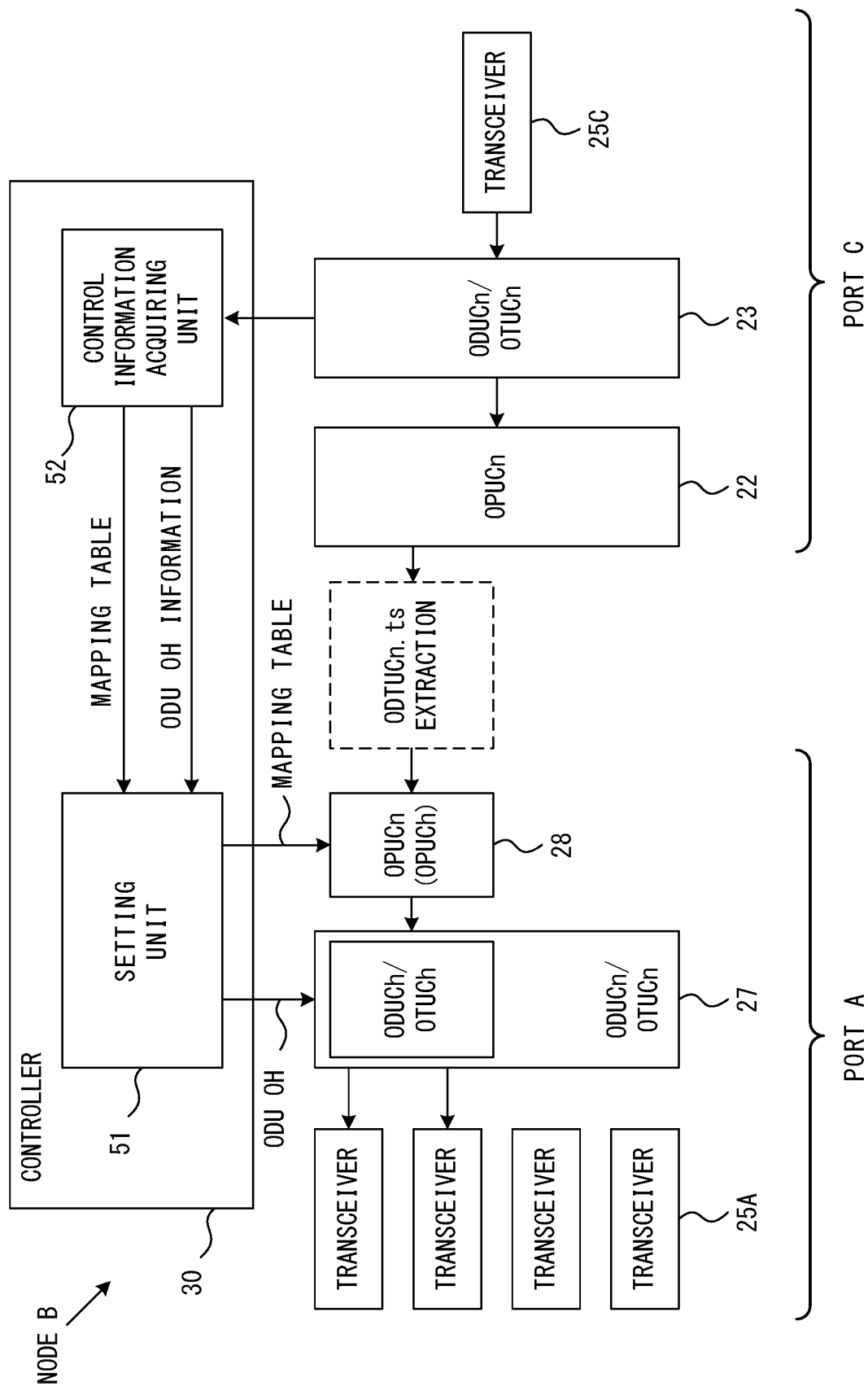
FIG. 32 illustrates still another example of the node device for connecting between the ODUCn path and the ODUCh path.

FIG. 32 illustrates still another example of the node device for connecting between the ODUCn path and the ODUCh path. In the example, the node device Z transmits the TS configuration information (Z→B) and TS configuration information (B→A) illustrated in FIG. 30 to the node device B. Herein, a set of the TS configuration information (Z→B) and TS configuration information (B→A) is substantially the same as the mapping table generated by the node device B in FIG. 31. Accordingly, in this Embodiment, the control information acquiring unit 51 acquires the TS configuration information (Z→B) and TS configuration information (B→A) from the received frame, and the node device B is thereby capable of acquiring the mapping table. Other operation is substantially the same as in FIGS. 31 and 32, and the description thereof is omitted.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:
1. An optical transmission device used in a communication system that transmits a frame, the optical transmission device comprising:
a first frame reproducing circuit configured to reproduce a frame from a first optical signal that is transmitted from a correspondent device;
a second frame reproducing circuit configured to reproduce a frame from a second optical signal that is transmitted from the correspondent device; and
a signal processor configured to extract a client signal from a frame reproduced by at least one of the first frame reproducing circuit and the second frame reproducing circuit,
wherein the correspondent device comprises:
a second signal processor configured to accommodate a client signal into one or a plurality of time slot sequences among n time slot sequences;
a first frame generator circuit configured to generate a frame including the client signal accommodated into a part of time slot sequences among the n time slot sequences; and
a second frame generator circuit configured to generate a frame including the client signal accommodated into other time slot sequences among the n time slot sequences, wherein
the second signal processor accommodates the client signal into the n time slot sequences when the first frame generator circuit and the second frame generator circuit are implemented,
the second signal processor accommodates the client signal into the other time slot sequences when the first frame generator circuit is not implemented and the second frame generator circuit is implemented, and
a bandwidth of the frame generated by the second frame generator circuit when the first frame generator circuit is not implemented and the second frame generator circuit is implemented is respectively equal to a bandwidth of the frame generated by the first frame generator circuit and a bandwidth of the frame generated by the second frame generator circuit when the first frame generator circuit and the second frame generator circuit are implemented, and
wherein when the optical transmission device receives information indicating that the first frame generator circuit is under update from the correspondent device, the first frame reproducing circuit stops operation, and the signal processor extracts the client signal from the frame reproduced by the second frame reproducing circuit.

2. An optical transmission system where a first optical transmission device transmits a frame to a third optical transmission device via a second optical transmission device, wherein
the first optical transmission device includes
a first signal processor configured to accommodate a client signal into one or a plurality of time slot sequences among n time slot sequences,
a first frame generator circuit configured to generate a frame including the client signal accommodated into a part of time slot sequences among the n time slot sequences,
a second frame generator circuit configured to generate a frame including the client signal accommodated into other time slots sequence among the n time slot sequences, and
a memory configured to store first time slot configuration information indicative of time slot sequences for accommodating the client signal when the first frame generator circuit and the second frame generator circuit are implemented, and second time slot configuration information indicative of time slot sequences for accommodating the client signal when the first frame generator circuit is not implemented and the second frame generator circuit is implemented,
the first signal processor accommodates the client signal into one or a plurality of time slot sequences according to the first time slot configuration information, when the first frame generator circuit and the second frame generator circuit are implemented,
the first signal processor accommodates the client signal into one or a plurality of time slot sequences according to the second time slot configuration information, when the first frame generator circuit is not implemented and the second frame generator circuit is implemented,
a bandwidth of the frame generated by the second frame generator circuit when the first frame generator circuit is not implemented and the second frame generator circuit is implemented is equal respectively to a bandwidth of the frame generated by the first frame generator circuit and a bandwidth of the frame generated by the second frame generator circuit when the first frame generator circuit and the second frame generator circuit are implemented,
the first optical transmission device transmits the first time slot configuration information and the second time slot configuration information to the second optical transmission device, when the first frame generator circuit is not implemented and the second frame generator circuit is implemented,
the second optical transmission device includes a second signal processor configured to accommodate a client signal into n time slot sequences, and
when the first frame generator circuit is not implemented and the second frame generator circuit is implemented, the second signal processor acquires a client signal from a received signal based on the second time slot configuration information, and accommodates the acquired client signal into the n time slot sequences based on the first time slot configuration information.

3. The optical transmission system according to claim 2, wherein
the second optical transmission device transmits, to the third optical transmission device, third time slot configuration information indicative of time slot sequences into which the client signal is accommodated by the second signal processor, and
the third optical transmission device determines a client signal transmitted from the third optical transmission device to the first optical transmission device, based on the third time slot configuration information, and transmits fourth time slot configuration information indicative of time slot sequences for accommodating the determined client signal to the second optical transmission device.

4. A method of updating an optical transmission device that includes a signal processor configured to accommodate a client signal into one or a plurality of time slot sequences among n time slot sequences, a first frame generator circuit configured to generate a frame including the client signal accommodated into a part of time slot sequences among the n time slot sequences, and a second frame generator circuit configured to generate a frame including the client signal accommodated into other time slot sequences among the n time slot sequences, wherein
the signal processor shifts from a first state in which the client signal is accommodated into the n time slot sequences to a second state in which the client signal is accommodated into the other time slot sequences,
a first transceiver circuit that is connected to the first frame generator circuit is stopped, while the frame generated by the second frame generator circuit is transmitted using a second transceiver circuit, the first transceiver circuit including a plurality of transceivers,
while the first transceiver circuit is stopped, the client signal is accommodated into the other time slot sequences such that an amount of the client signal accommodated into the other time slot sequences does not exceed a bandwidth of the second frame generator and transmitted by the second transceiver circuit,
the signal processor shifts to the first state from the second state after the first transceiver circuit is replaced with a third transceiver circuit, and
the frame generated by the first frame generator circuit is transmitted using the third transceiver circuit, while the frame generated by the second frame generator circuit is transmitted using the second transceiver circuit, a bandwidth of the third transceiver circuit being equal to a sum of bandwidths of the plurality of the transceivers included in the first transceiver circuit.

5. The method of updating the optical transmission device according to claim 4, wherein a second signal processor configured to accommodate the client signal into h (h<n) time slot sequences and a third frame generator circuit configured to generate a frame including the client signal accommodated into the h time slot sequences are added to the optical transmission device, and the second signal processor accommodates preferential traffic in the client signal into the h time slot sequences.

\* \* \* \* \*